(12) United States Patent
Boerensen et al.

(10) Patent No.: US 10,323,594 B2
(45) Date of Patent: Jun. 18, 2019

(54) METHODS AND SYSTEMS FOR TREATING VEHICLE EMISSIONS

(71) Applicant: Ford Global Technologies, LLC, Dearborn, MI (US)

(72) Inventors: Christoph Boerensen, Aachen (DE); Dirk Roemer, Cologne (DE); Frank Linzen, Aachen (DE); Felix Goebel, Aachen (DE); Brendan Patrick Carberry, Aachen (DE); Evgeny Smirnov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/618,022

(22) Filed: Jun. 8, 2017

(65) Prior Publication Data

US 2017/0363029 A1 Dec. 21, 2017

(30) Foreign Application Priority Data

Jun. 17, 2016 (DE) .................. 10 2016 210 897
Jun. 17, 2016 (DE) .................. 10 2016 210 899

(51) Int. Cl.
*F02D 41/14* (2006.01)
*F01N 3/08* (2006.01)
(Continued)

(52) U.S. Cl.
CPC ....... *F02D 41/1454* (2013.01); *F01N 3/0814* (2013.01); *F01N 3/0842* (2013.01);
(Continued)

(58) Field of Classification Search
CPC .. F02D 41/02; F02D 41/0235; F02D 41/0275; F02D 41/14; F02D 41/1454;
(Continued)

(56) References Cited

U.S. PATENT DOCUMENTS 6,539,709 B2    4/2003 Kubo et al.
6,862,879 B2    3/2005 Upadhyay et al.
(Continued)

FOREIGN PATENT DOCUMENTS

DE    10043798 A1    3/2002
DE    10113947 A1    9/2002
(Continued)

OTHER PUBLICATIONS

Li, W. et al., "Passive Ammonia SCR for Lean Burn SIDI Engines," Proceedings of the 2009 Directions in Engine-Efficiency and Emissions Research (DEER) Conference, Aug. 3, 2009, Dearborn, Michigan, 15 pages.
(Continued)

*Primary Examiner* — Hung Q Nguyen
*Assistant Examiner* — Johnny H Hoang
(74) *Attorney, Agent, or Firm* — Julia Voutyras; McCoy Russell LLP

(57) ABSTRACT

A method for controlling exhaust gas aftertreatment in an exhaust gas aftertreatment system having at least one nitrogen oxide storage catalyst and at least one catalyst for selective catalytic reduction is provided, wherein, in phases of a high load, a combustion engine is operated with a substoichiometric fuel/air mixture, and nitrogen oxides in the exhaust gas are reduced in the nitrogen oxide storage catalyst to ammonia, which is stored in the catalyst for selective catalytic reduction, and, when the storage capacity of the catalyst for selective catalytic reduction is exceeded, the combustion engine is operated with a superstoichiometric fuel/air mixture, thus allowing nitrogen oxides in the catalyst for selective catalytic reduction to be reduced by the stored ammonia.

13 Claims, 12 Drawing Sheets

(51) Int. Cl.
*F01N 3/20* (2006.01)
*F01N 11/00* (2006.01)
*F02D 41/02* (2006.01)
*F02D 41/26* (2006.01)
*F01N 9/00* (2006.01)
*F01N 13/00* (2010.01)

(52) U.S. Cl.
CPC ............ *F01N 3/2066* (2013.01); *F01N 9/00* (2013.01); *F01N 11/00* (2013.01); *F01N 13/0093* (2014.06); *F02D 41/0235* (2013.01); *F02D 41/0275* (2013.01); *F02D 41/26* (2013.01); *F01N 2340/02* (2013.01); *F01N 2430/06* (2013.01); *F01N 2610/02* (2013.01); *F01N 2900/1602* (2013.01); *F01N 2900/1616* (2013.01); *F02D 2041/1468* (2013.01); *F02D 2200/08* (2013.01); *Y02A 50/2325* (2018.01); *Y02T 10/24* (2013.01); *Y02T 10/47* (2013.01)

(58) Field of Classification Search
CPC .......... F02D 41/26; F01N 3/08; F01N 3/0842; F01N 3/20; F01N 3/2066; F01N 11/00
USPC ................ 123/429, 434–436, 443, 700, 704; 701/101–105
See application file for complete search history.

(56) References Cited

U.S. PATENT DOCUMENTS

| | | | |
|---|---|---|---|
| 7,650,746 B2 | 1/2010 | Hu et al. | |
| 7,673,445 B2 | 3/2010 | Goralski, Jr. et al. | |
| 8,041,498 B2 | 10/2011 | Brown et al. | |
| 8,297,044 B2 | 10/2012 | Tsujimoto et al. | |
| 8,555,617 B2 | 10/2013 | Mital | |
| 8,677,734 B2 | 3/2014 | Ramanathan et al. | |
| 8,726,638 B2 | 5/2014 | Hoard et al. | |
| 8,752,367 B2 | 6/2014 | Goersmann et al. | |
| 8,978,368 B2 | 3/2015 | Harmsen et al. | |
| 8,980,783 B2 | 3/2015 | Choung et al. | |
| 9,267,408 B2 * | 2/2016 | Doering | F01N 3/208 |
| 9,657,673 B2 | 5/2017 | Yasui et al. | |
| 2006/0168948 A1 | 8/2006 | Xu et al. | |
| 2010/0115926 A1* | 5/2010 | Nagaoka | B01D 53/9459 60/286 |
| 2014/0157760 A1 | 6/2014 | Tufail et al. | |
| 2015/0037233 A1 | 2/2015 | Fedeyko et al. | |
| 2015/0308363 A1 | 10/2015 | Choi | |

FOREIGN PATENT DOCUMENTS

| | | |
|---|---|---|
| DE | 102009038948 A1 | 4/2010 |
| DE | 102013200361 A1 | 9/2013 |
| DE | 102014200092 A1 | 7/2014 |
| DE | 102014224397 A1 | 6/2015 |
| DE | 112012006719 T5 | 9/2015 |
| EP | 2783741 A2 | 10/2014 |

OTHER PUBLICATIONS

Parks, J. et al., "Ammonia Production and Utilization in a Hybrid LNT#SCR System," Proceedings of the SAE 2009 Powertrains Fuels and Lubricants Meeting, Nov. 2, 2009, San Antonio, Texas, 12 pages.

* cited by examiner

METHODS AND SYSTEMS FOR TREATING VEHICLE EMISSIONS

RELATED APPLICATIONS

This application claims priority to German Patent Application No. 102016210899.9, filed Jun. 17, 2016, and to German Patent Application No. 102016210897.2, filed Jun. 17, 2016. The entire contents of the above-referenced applications are hereby incorporated by reference in their entirety for all purposes.

FIELD

The present description relates generally to adjusting engine operating parameters based on a close-coupled aftertreatment device.

BACKGROUND/SUMMARY

The present disclosure relates to a method for controlling exhaust gas aftertreatment in an exhaust gas aftertreatment system having at least one nitrogen oxide storage catalyst and at least one catalyst for selective catalytic reduction.

Nitrogen oxide storage catalysts (also referred to as lean NOx traps, LNT) may be used for the temporary adsorption of nitrogen oxides ($NO_x$) from the exhaust gas of combustion engines. In addition, they perform their functions of oxidative aftertreatment of carbon monoxide (CO) and hydrocarbons (HC). Nitrogen oxides formed in lean-mixture operation of a combustion engine can be stored in an LNT; for this purpose, the LNT oxidizes the nitric oxide (NO) contained in the lean exhaust gas to nitrogen dioxide ($NO_2$) and then stores it in the form of nitrates. Barium oxide and/or other oxides, for example, are used as adsorption agents, which are incorporated into the coating of the LNT.

Once the storage capacity of the LNT is exhausted, LNT regeneration is desired. During a regeneration event (purge), rich exhaust gas conditions may be provided for a few seconds, e.g. by operating the combustion engine with a rich, i.e. substoichiometric, fuel/air mixture; during this process, the stored nitrogen oxides are desorbed again and are reduced to nitrogen over catalytically active components of the LNT with the aid of the rich exhaust gas constituents (CO, HC). In addition to a purge effected purely for regeneration, the LNT is also regenerated if the exhaust gas becomes richer owing, for example, to rich-mixture operation of the combustion engine due to a power demand.

In the LNT, the stored nitrates furthermore react with molecular hydrogen, which is formed under rich exhaust gas conditions owing to incomplete combustion of the fuel and also owing to reactions in the LNT, as a result of which ammonia is also produced during a regeneration. It is possible to make use of this ammonia by storing it downstream in a passive catalyst for selective catalytic reduction (SCR). In the SCR, the stored ammonia is used to reduce nitrogen oxides to nitrogen under lean exhaust gas conditions. To enable the SCR catalyst to have a high storage capacity, it is advantageously installed sufficiently far downstream to ensure that optimum operating temperatures are obtained. The corresponding temperature range is a function of the specific SCR coating and is known to a person skilled in the art. Herein, upstream and downstream may be described relative to an exhaust gas flow from an engine, wherein upstream refers to components closer to the engine than downstream. As such, exhaust gas contacts upstream components before downstream components.

Among the factors limiting the storage capacity of an LNT is the temperature of the exhaust gas. Modern LNTs can store nitrogen oxides with different degrees of efficiency in a temperature range of 250-550° C. The storage capacity can furthermore be limited by the space velocity of the exhaust gas. When the combustion engine is operated under a high load, e.g. during an acceleration event, high exhaust gas temperatures and velocities are brought about, and these exceed the technological limits of the LNT. In this case, there can be a "nitrogen oxide breakthrough" since the nitrogen oxides cannot be stored and escape from the LNT. This may lead to $NO_x$ slip, which includes emitting $NO_x$ from the vehicle to an ambient atmosphere outside the vehicle.

Previous solutions include injecting reductant into an exhaust system during high temperature engine operating parameters. However, the inventors have found issues with these applications. As one example, reductant injection systems rely on complex control schemes and valves to implement the desired injection volumes, injection timings, and the like. They often demand routine fill-up of a reductant reservoir, which may be cumbersome to a vehicle operator. Furthermore, these reductant systems are expensive to manufacture and present packaging restraints.

In one example, the issues described above may be addressed by a method comprising adjusting an air/fuel ratio of a combustion engine, the engine comprising an exhaust tract connected fluidly to the combustion engine, two or more exhaust gas aftertreatment devices arranged in the exhaust tract comprising at least one nitrogen oxide storage catalyst, at least one catalyst for selective catalytic reduction arranged downstream of the first nitrogen oxide storage catalyst, at least one lambda probe, at least one temperature sensor, and a control unit, operating a combustion engine at low load during a first condition where a torque request is less than a threshold torque request, changing to an operating state with a high load during a second condition where the torque request is greater than the threshold torque request, adjusting the air/fuel ratio from more rich to less rich during the second condition in response to an ammonia load stored in the selective catalytic reduction reaching an upper threshold ammonia load, adjusting the air/fuel ratio from less rich to more rich during the second condition in response to the ammonia load stored in the selective catalytic reduction reaching a lower threshold ammonia load, and adjusting the air/fuel ratio from rich to lean in when switching from the second condition to the first condition in response to the torque request being less than the threshold request. In this way, fuel economy may increase and $NO_x$ conversion into $NH_3$ may be increasingly utilized.

In one example, the emission of nitrogen oxides can be controlled under all operating conditions of the combustion engine. The high exhaust gas temperature which occurs at a high load is detected and transmitted to the control unit by the temperature sensor, which is advantageously arranged in the region of the first LNT. A large torque demand is furthermore detected and transmitted to the control unit in a manner known to a person skilled in the art. The control unit then triggers rich-mixture operation of the combustion engine if it is not already in effect. Under these conditions, ammonia is formed by the reaction of hydrogen with nitrogen oxides over catalytically active constituents of the LNT as soon as previously stored oxygen has been removed from the LNT. Downstream, the gaseous ammonia together with the exhaust gas flow from the LNT enters the SCR, where it is stored. When the storage capacity of the SCR is exhausted (e.g., full of ammonia), the combustion engine is temporarily operated under lean conditions. In this case, nitrogen oxides which are not stored in the LNT are transferred into the SCR with the exhaust gas flow and are reduced there to nitrogen by selective catalytic reduction using the stored ammonia. Once the stored ammonia has been consumed, the combustion engine is again operated in a rich mode. Once the high-load phase is past, the combustion engine is again operated in a conventional mode under lean conditions, in which nitrogen oxide is stored in the LNT, which is regenerated by brief purges. It is clear to a person skilled in the art here how a high and a low load of a combustion engine are defined. Herein, high load refers to a torque demand being greater than a threshold torque demand. An exhaust gas temperature is greater than a threshold temperature (e.g., 550° C.) when the engine load is high and $NO_x$ may leak from the LNT. As such, torque demands lower than the threshold torque demand may correspond to exhaust gas temperatures and conditions where the LNT may capture and store $NO_x$ without adjusting combustion air/fuel ratios.

In one embodiment, the combustion engine changes repeatedly from a rich to a lean combustion mode if the upper threshold value of the ammonia reserve stored in the SCR is reached, and from a lean to a rich combustion mode if the lower threshold value of the ammonia reserve stored in the SCR is reached. The upper threshold value of the ammonia reserve may be determined by measuring an ammonia slip through the SCR via a suitable sensor. In this way, the nitrogen oxide emissions can advantageously be controlled for as long as the high-load phase lasts.

Additionally or alternatively, some embodiments comprise a first and a second LNT. As a particular preference, the second LNT is arranged downstream of the first LNT in the flow direction of the exhaust gas. The arrangement of the second LNT is advantageous because it is subject to lower temperatures than the first LNT owing to the fact that it is further away from the combustion engine than the first LNT. It can therefore store nitrogen oxides which have not been stored in the first LNT or have escaped therefrom. The regeneration of the second LNT can furthermore take place in an effective manner by virtue of the substoichiometric conditions, by means of which the rich exhaust gas provided for the reduction of the first LNT is additionally enriched by ammonia and hydrogen from the first LNT and contains even less oxygen than the rich exhaust gas flowing directly out of the combustion engine.

The reaching of the upper threshold value of the ammonia reserve stored in the SCR is determined on the basis of a model. A self-ignition combustion engine may be used as the combustion engine. The engine may have any number of cylinders and geometries without departing from the scope of the present disclosure. As such, the engine may be an I-4 engine, a V-6 engine, a W-16 engine, and the like.

A second aspect of the present disclosure relates to an arrangement for carrying out a method according to the present disclosure, comprising a combustion engine, an exhaust tract connected fluidically to the combustion engine, an exhaust gas aftertreatment device arranged in the exhaust tract and comprising at least one first LNT, at least one SCR arranged downstream thereof, at least one lambda probe, at least one temperature sensor, at least one nitrogen oxide sensor, and a control unit. The arrangement comprises a second LNT, which is arranged downstream of the first LNT. In other words, the second LNT is arranged between the first LNT and the SCR. In one example, the first LNT is a close-coupled LNT, where a distance between outlets of the engine and the first LNT is minimized.

In some examples, there may be a first LNT and a second LNT, with no SCR located in the exhaust system. In the LNTs, the stored nitrates furthermore react with molecular hydrogen, which is formed under rich exhaust gas conditions owing to incomplete combustion of the fuel and also owing to reactions in the LNT, as a result of which ammonia can also be produced during a regeneration. It is possible to make use of this ammonia to further reduce the nitrogen oxide concentration in the exhaust gas in the second LNT arranged downstream of the first LNT.

In such an example, a method may reduce emission of nitrogen oxides under all operating conditions of the combustion engine. The high exhaust gas temperature which arises during a high load is detected by the temperature sensor, which is advantageously arranged in the region of the first LNT, and is transmitted to the control unit or determined by a stored temperature model. A high torque demand is furthermore also detected in a manner known to a person skilled in the art and transmitted to the control unit. This may be determined via a crankshaft sensor, a pedal position sensor, throttle position sensor, and the like. The control unit then initiates rich-mixture operation of the combustion engine unless it is already taking place. The first LNT no longer acts as a storage catalyst under these conditions but immediately converts the nitrogen oxides present in the exhaust gas to nitrogen with the aid of the reducing agents (carbon monoxide and hydrocarbons) likewise present in the exhaust gas. In this way, nitrogen oxides are advantageously removed from the exhaust gas emerging from the combustion engine under the conditions of a high load, while the nitrogen oxide storage efficiency of the LNT is greatly reduced owing to the gas temperature and the space velocity.

The rich-mixture component in the exhaust gas can furthermore be set in such a way that ammonia is formed under these conditions over the catalytically active constituents of the first LNT through the reaction of hydrogen with nitrogen oxides as soon as previously stored oxygen has been removed from the first LNT. This ammonia can be used downstream to further reduce the nitrogen oxides with the aid of a second LNT.

Once the phase of a high load is past, the combustion engine is once again operated in a conventional mode under lean conditions, in which nitrogen oxide is stored in the first LNT, which is regenerated by brief purges.

The phase of rich-mixture operation can furthermore also be ended if this is necessary to protect components, e.g. from excessive temperatures.

Step S3 of the method according to the present disclosure is preferably carried out if a predetermined threshold value of the temperature in the first LNT is reached. This threshold value is advantageously approximately at the temperature above which the LNT can no longer store nitrogen oxides efficiently. This value may be greater than 550° C.

The arrangement of the second LNT is desired because, owing to its being further away from the combustion engine than the first LNT, it is exposed to lower temperatures than the first LNT. In superstoichiometric exhaust gas conditions, it can therefore store nitrogen oxides which have not been stored in the first LNT or have escaped therefrom. The regeneration of the second LNT can furthermore take place in an effective manner by virtue of the substoichiometric conditions, by means of which the rich exhaust gas provided for the reduction of the first LNT is additionally enriched by ammonia and hydrogen from the first LNT and contains even less oxygen than the rich exhaust gas flowing directly out of the combustion engine. It is therefore particularly preferred if, in the method according to the present disclosure, the first nitrogen oxide storage catalyst is operated in such a way that it produces ammonia, which can be used in the second nitrogen oxide storage catalyst for the further reduction of nitrogen oxides.

A second aspect of the present disclosure relates to an arrangement which is designed for carrying out a method according to the present disclosure, comprising a combustion engine, an exhaust tract connected fluidically to the combustion engine, at least one first nitrogen oxide storage catalyst, at least one lambda probe, at least one temperature sensor and a control unit.

There is a particular preference for an embodiment of the arrangement in which the first nitrogen oxide storage catalyst is arranged in such spatial proximity to the combustion engine that exhaust gas temperatures which occur under high load prevent effective storage of nitrogen oxides, and the second nitrogen oxide storage catalyst is arranged at such a spatial distance from the combustion engine that effective storage of nitrogen oxides is possible even at exhaust gas temperatures which occur under high load.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
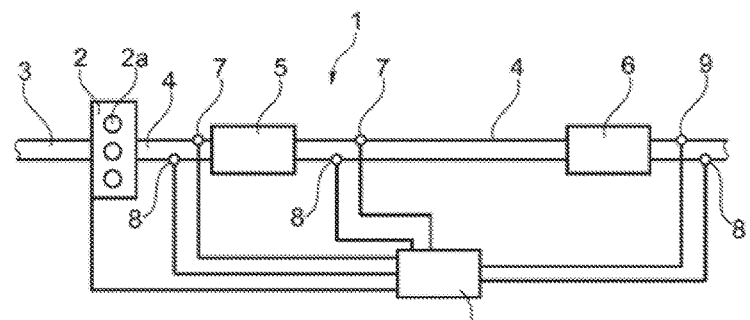
FIG. 1 shows a first embodiment including a LNT upstream of an SCR.
Figure 3:
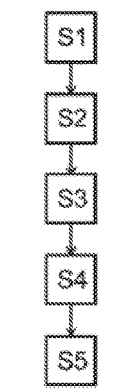
FIG. 3 shows a method corresponding to the first embodiment.

The following description relates to systems and methods for adjusting an air/fuel ratio of an engine in response to an aftertreatment device temperature. The engine comprises an exhaust tract having at least one lean $NO_x$ trap (LNT) and at least one selective catalytic reduction (SCR) device. The LNT and SCR may be spatially separated from one another such that the LNT is close-coupled (CC) to the engine and the SCR is spaced away from the engine. In this way, the CC LNT may be hotter than the SCR. FIG. 1 depicts an exhaust passage having the above described arrangement. A method for adjusting one or more engine operating parameters based on conditions estimated and/or measured at the LNT and/or the SCR is shown in FIG. 3.

Figure 2:
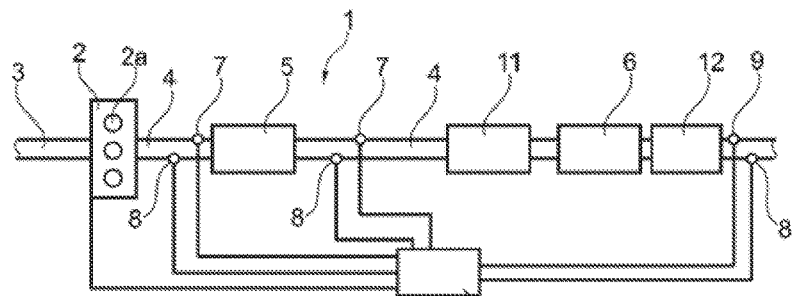
FIG. 2 shows a second embodiment including a first LNT, a second LNT, and an SCR.
Figure 4:
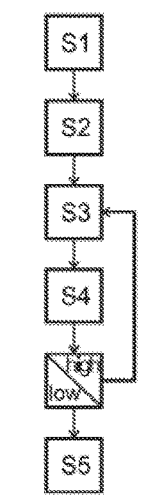
FIG. 4 shows a method corresponding to the second embodiment.

Additionally or alternatively, a second LNT may be arranged between the CC LNT and the SCR. The second LNT may experience temperatures between the CC LNT and the SCR. As such, the second LNT is not as hot as the CC LNT, but is hotter than the SCR. In one example, the CC LNT and the second LNT are substantially identical in size and catalytic composition. FIG. 2 depicts this arrangement. A method for adjusting one or more engine operating parameters based on conditions estimated and/or measured at the LNT and/or the SCR is shown in FIG. 4.

Figure 5:
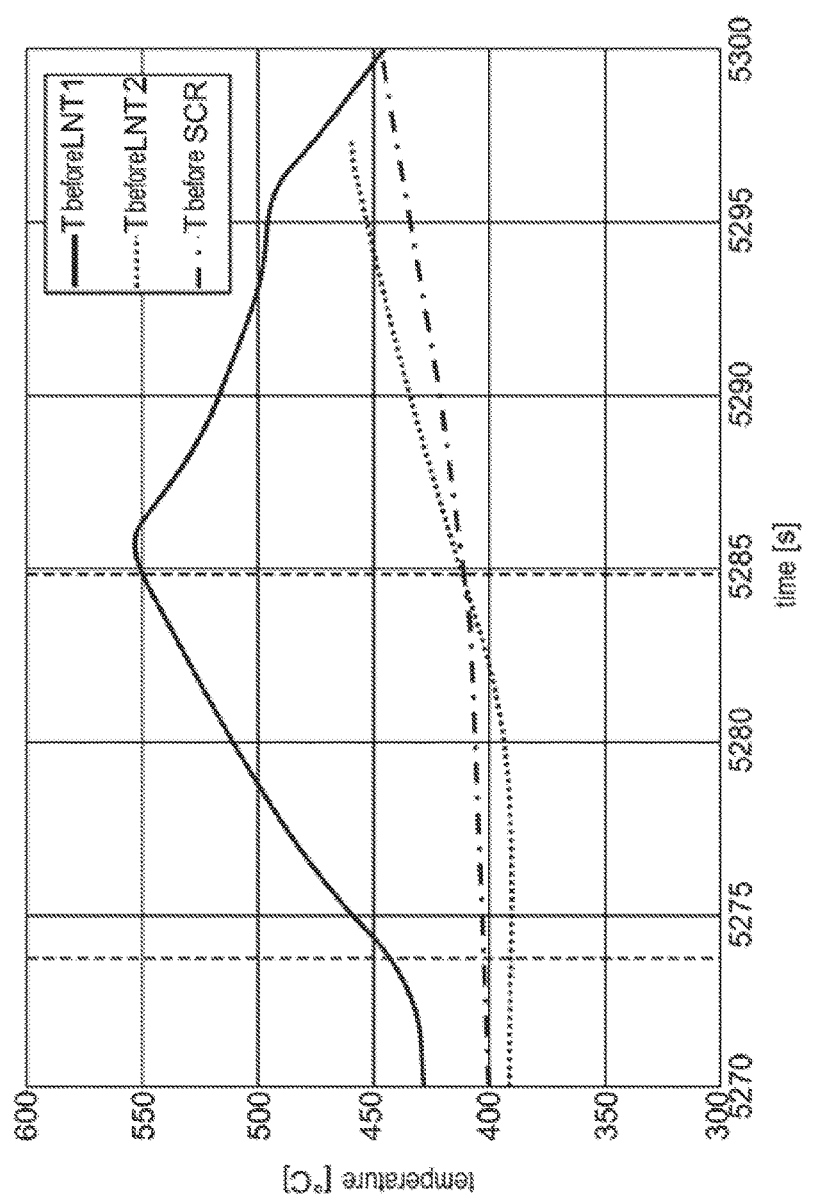
FIG. 5 shows a diagram illustrating a temperature profile at various points in the exhaust tract during the time in a rich-mixture operating mode.
Figure 6:
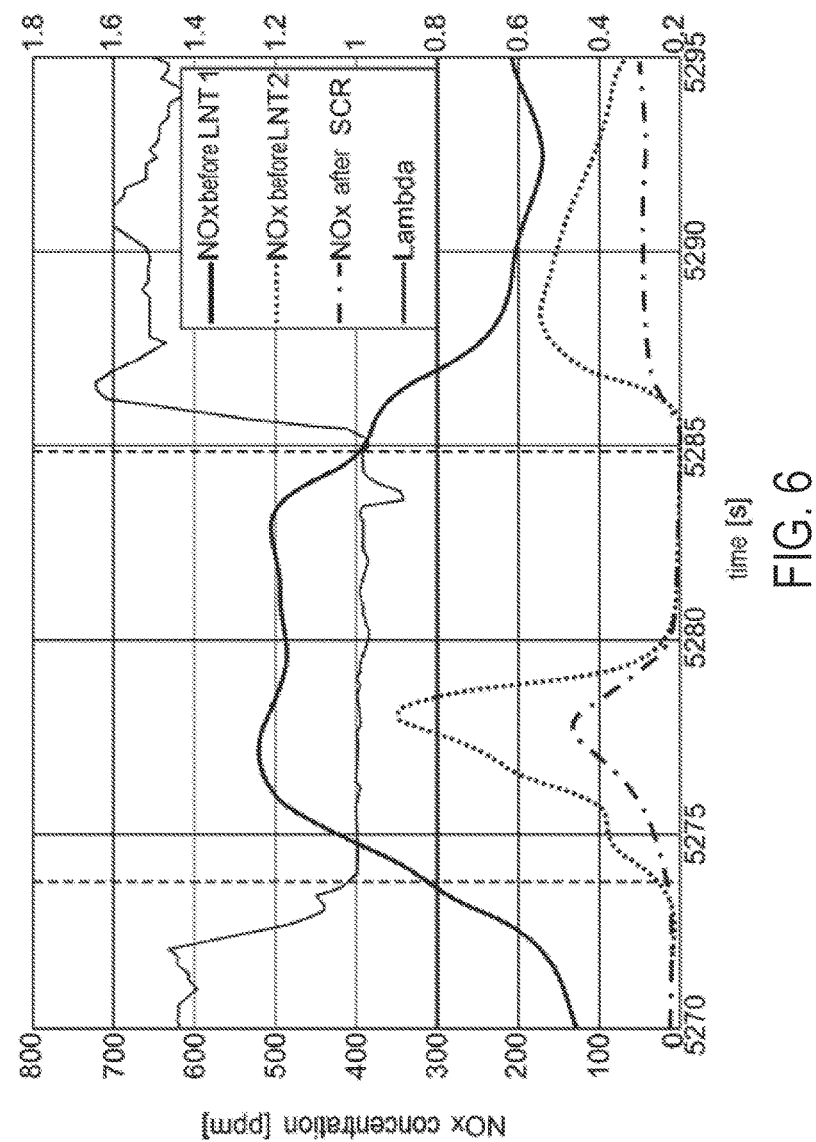
FIG. 6 shows a diagram illustrating nitrogen oxide reduction during the time in a rich-mixture operating mode
Figure 7:
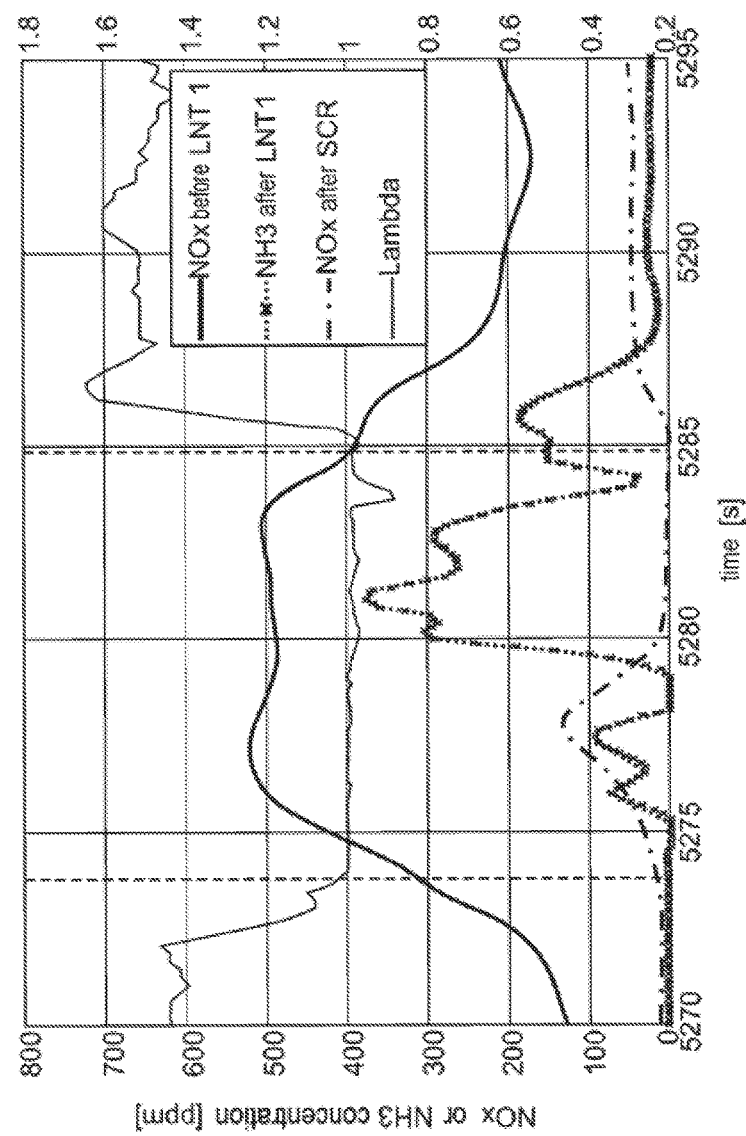
FIG. 7 shows a diagram illustrating an ammonia content during the time in a rich-mixture operating mode.

A temperature profile of each of the CC LNT, second LNT, and the SCR is shown in FIG. 5. A concentration of $NO_x$ adjacent to each of the CC LNT, second LNT, and the SCR is shown in FIG. 6. A concentration of $NO_x$ and/or ammonia ($NH_3$) adjacent to each of the CC LNT, second LNT, and the SCR is shown in FIG. 7.

An engine may be mounted in a hybrid vehicle having the LNTs and SCR described above, as shown in FIG. 8. A method for operating an AFR of the engine in response to one or more conditions of the CC LNT and the SCR is shown in FIGS. 9A, 9B, and 9C. FIGS. 10-13 show various operating sequences of the engine.

According to the illustration in FIG. 1, one embodiment of an arrangement 1 according to the present disclosure has a combustion engine 2, which is connected fluidically to an intake tract 3 for supplying combustion air and to an exhaust tract 4 for discharging exhaust gas. The combustion engine 2 is a self-ignition combustion engine but, as an alternative, can also be an applied-ignition combustion engine. In the illustration, the combustion engine 2 has three cylinders 2a, but it can also have a different number of cylinders. A first nitrogen oxide storage catalyst (LNT) 5 is arranged in the exhaust tract for the aftertreatment of the exhaust gas, and a catalyst for selective catalytic reduction (SCR) 6 is arranged in the exhaust tract downstream of the first LNT 5. A lambda probe 7 and a temperature sensor 8 are arranged in the exhaust tract upstream of the first LNT 5. Additional lambda probes 7 and temperature sensors 8 are situated downstream of the first LNT 5. Another temperature sensor 8 and a nitrogen oxide sensor 9 are arranged downstream of the SCR 6. Additional lambda probes, temperature sensors and nitrogen oxide sensors as well as other sensors, e.g. ammonia sensors or pressure sensors, can be arranged at various points in the exhaust tract 4. In some cases, the measured values determined by the sensors can also be made available by models. The sensors are connected to a control unit 10, to which the measured values are transmitted. The control unit 10 is furthermore connected to the combustion engine 2 in order to issue control commands relating to a rich or lean mode based on an evaluation of the measured values. Rich-mixture operation can be achieved, for example, by reducing the intake air supply by means of a throttle valve arranged in the intake tract 3 or by recirculating exhaust gas from the exhaust tract 4 into the intake tract 3, by afterinjection of fuel or by a combination of this or other measures.

In another embodiment according to the illustration in FIG. 2, the arrangement 1 has a second LNT 11, which is arranged in the exhaust tract 4 downstream of the first LNT 5 and upstream of the SCR 6. A diesel particulate filter 12 is furthermore arranged downstream of the SCR 6. The particulate filter 12 can have a catalytically active coating and can also be situated at some other point in the exhaust system. In this embodiment, another temperature sensor 8 is arranged downstream of the SCR 6 and another temperature sensor 8 is arranged downstream of the diesel particulate filter 12. Apart from the special features of the embodiment shown in FIG. 2 which have been mentioned, it corresponds to the embodiment shown in FIG. 1.

In one embodiment of the method shown in FIG. 3, the combustion engine 2 is operated at a low load in a first step S1. In this case, a lean combustion mode is set, as a result of which lean exhaust gas is also produced. Here, nitrogen oxides which are formed during this process are stored in the first LNT 5 and are resorbed and reduced in short phases with rich exhaust gas by the LNT 5. In a second step S2, a change is made to a high-load operating state. This takes place, for example, in the context of an acceleration demand, in which the gas pedal is depressed fully or to a significantly greater extent than in uniform driving. In this case, exhaust gas is produced at a temperature which is increased to such an extent as compared with normal operation that the first LNT 5 can no longer effectively store nitrogen oxides. In a third step S3, therefore, a rich combustion mode is initiated. In this case, the nitrogen oxides contained in the exhaust gas are partially reduced in the first LNT 5 to ammonia, which escapes from the first LNT 5 with the exhaust gas flow. The ammonia enters the SCR 6 arranged downstream, in which it is stored. Step S3 is continued until the quantity of ammonia stored in the SCR 6 reaches a predetermined upper threshold value. This is ascertained, for example, by detection of a certain quantity of ammonia escaping from the SCR 6 by means of an ammonia sensor or of the nitrogen oxide sensor 9. A person skilled in the art knows how an ammonia concentration can be detected and calculated by means of a nitrogen oxide sensor. When the upper threshold value of the ammonia stored in the SCR 6 is reached, a change is made to a lean combustion mode of the combustion engine 2. The stored ammonia air is then used in the SCR 6 to reduce nitrogen oxides.

In a fourth step S4, the combustion engine 2 is operated in the lean combustion mode until the ammonia reserve stored in the SCR 6 reaches a predetermined lower threshold value. This is ascertained, for example, by detection of a certain nitrogen oxide quantity escaping from the SCR 6 by means of the nitrogen oxide sensor 9. The ammonia has then been consumed. In a fifth step S5, the combustion engine 2 is then once again operated in an operating state with a low or normal load.

If the high load of the combustion engine 2 persists after step S4, the method switches repeatedly from a rich to a lean combustion mode if the upper threshold value is reached and from a lean to a rich combustion mode if the lower threshold value is reached. In other words, the method loops back repeatedly from step S4 to S3 if a high load persists (FIG. 4).

With the embodiment of the arrangement shown in FIG. 2, the steps of the method are carried out analogously. In FIG. 5 an example is used to illustrate how the temperature profile behaves during the operation of the combustion engine 2 with a high load, i.e. a high torque, at various positions of the arrangement. The duration of the high load is indicated by vertical dashed lines. In the region of the first LNT 5, in particular upstream of the first LNT 5 (solid line), the temperature rises to about 550° C. within a few seconds, while the temperature in the region of the second LNT 11, in particular upstream of the second LNT 11 (dotted line), rises to about 450° C. and that in the region of the SCR 6, in particular upstream of the SCR 6 (chain-dotted line) rises to just below 450° C. The temperatures in the second LNT 11 are therefore lower than in the first. The second LNT 11 can therefore either store (in lean exhaust gas) or reduce (in rich exhaust gas) nitrogen oxides that have escaped from the first LNT 5. During rich-mixture operation at high temperatures, it is not only ammonia but also hydrogen and carbon monoxide which escape from the first LNT 5. Both hydrogen and also carbon monoxide can reduce nitrogen oxides in the second LNT 11, wherein ammonia has a supportive effect. Once the second LNT 11 has been regenerated, ammonia is liberated from the second LNT 11 and stored downstream in the SCR 6 until it is used under lean conditions to reduce nitrogen oxides.

FIG. 6 shows by way of example how nitrogen oxides are removed from the exhaust gas flow during step S3 at various positions in the arrangement. The duration of the high load is indicated by vertical dashed lines. In the diagram in FIG. 6, the nitrogen oxide concentration is plotted against time. It can be seen that the nitrogen oxide concentration upstream of the first LNT 5 (solid line), upstream of the second LNT 11 (dotted line) and downstream of the SCR 6 (chain-dotted line) decreases during rich-mixture operation, wherein the nitrogen oxides are collected primarily by the first LNT 5 during rich-mixture operation of the combustion engine 2 selected under high load, while the nitrogen oxides are collected primarily by the second LNT 11 and the SCR 6 before and after the rich operating phase. The ammonia formed by the reduction of the nitrogen oxides under sub-stoichiometric conditions ensures an ammonia concentration in the arrangement 1 which rises continuously overall, this being visible in the diagram in FIG. 7, in which the ammonia concentration downstream of the first LNT 5 (dotted lines with asterisks) is plotted by way of example together with the NOx concentrations and lambda against time. If the ammonia concentration downstream of the SCR 6 rises beyond a predetermined value, which correlates with the upper threshold value of the ammonia concentration in the SCR 6, a switch is made to a lean-mixture operating mode of the combustion engine 2, and the method is continued with step S4.

Figure 8:
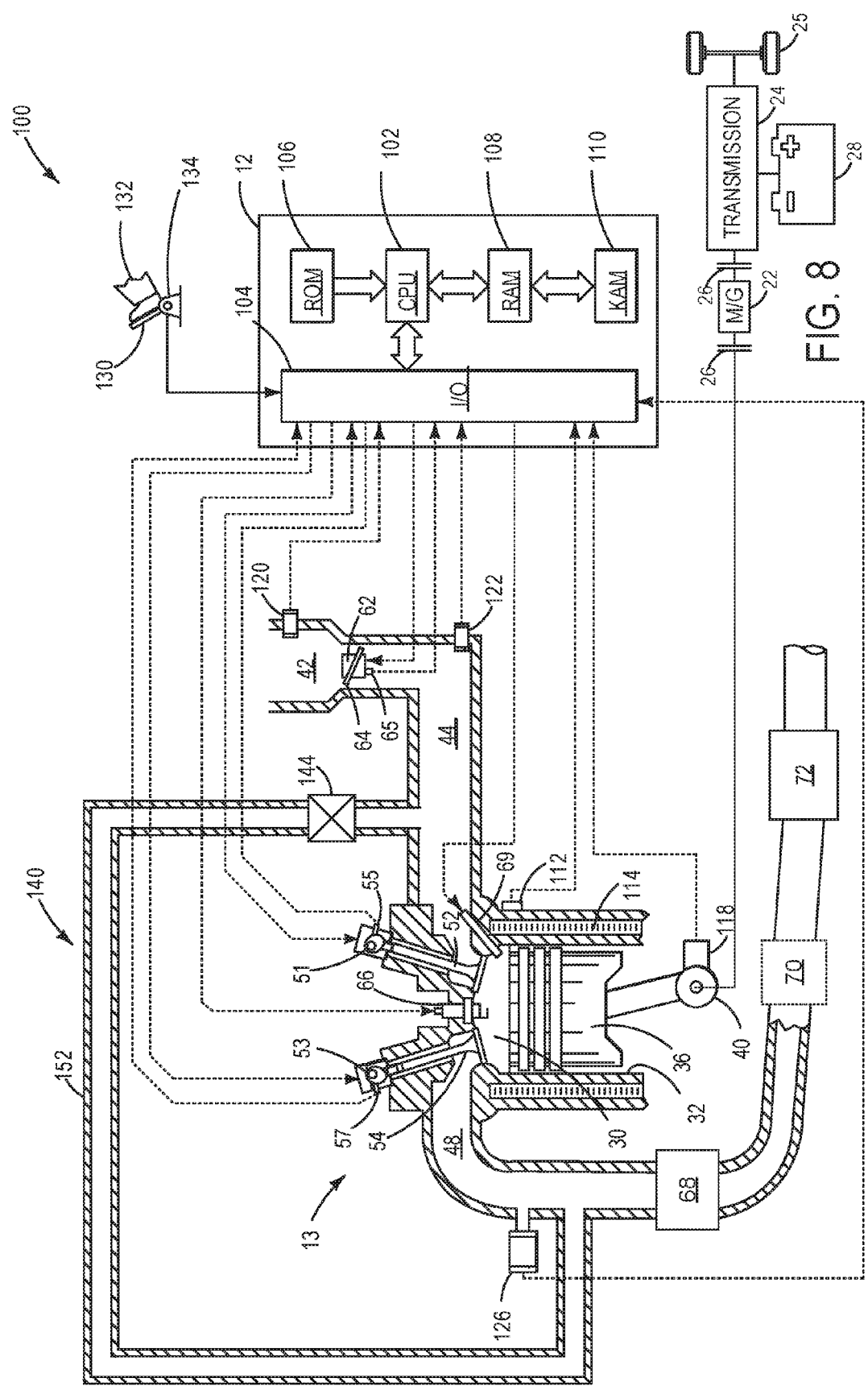
FIG. 8 shows an embodiment of an engine having at least a single cylinder.
Figure 9A:
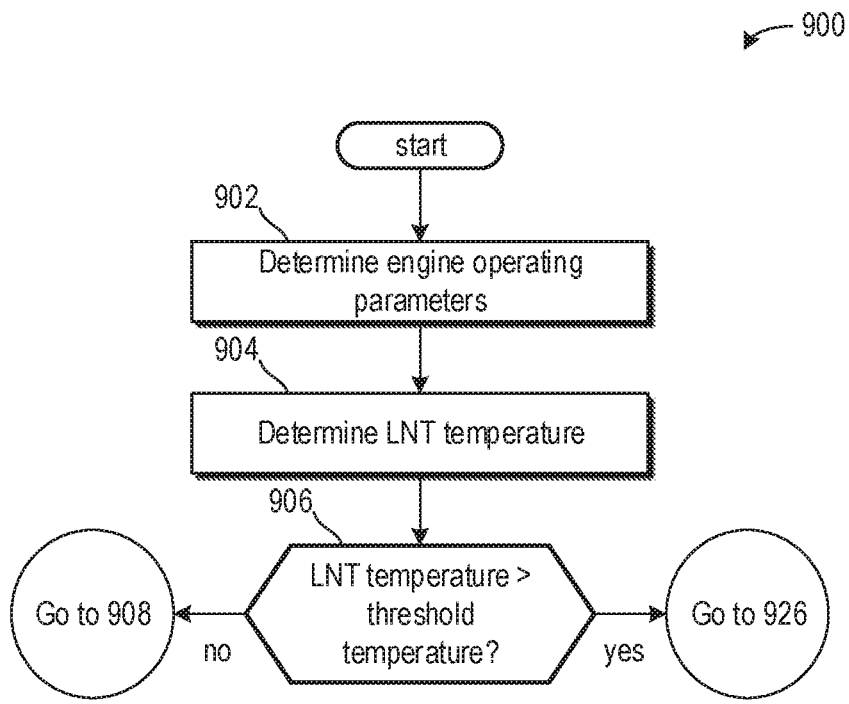
FIGS. 9A, 9B, and 9C show a method for adjusting an air/fuel ratio of the engine based on one or more conditions.
Figure 9B:
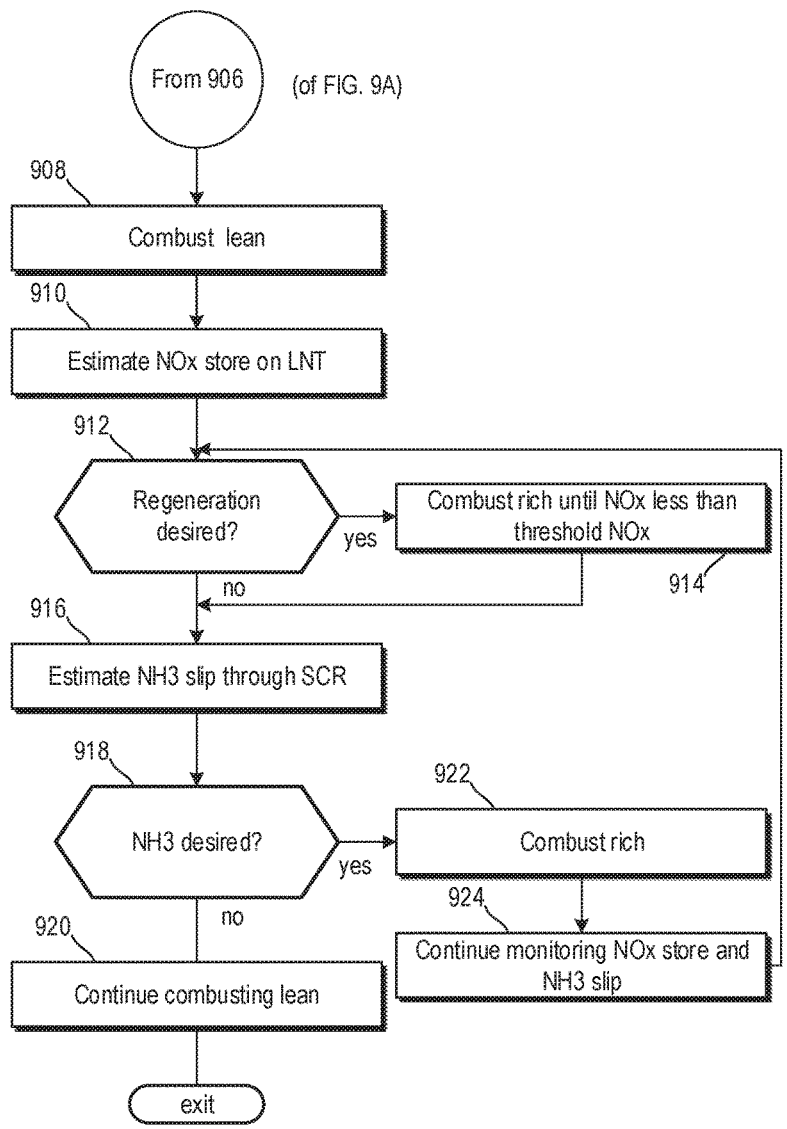
Figure 9C:
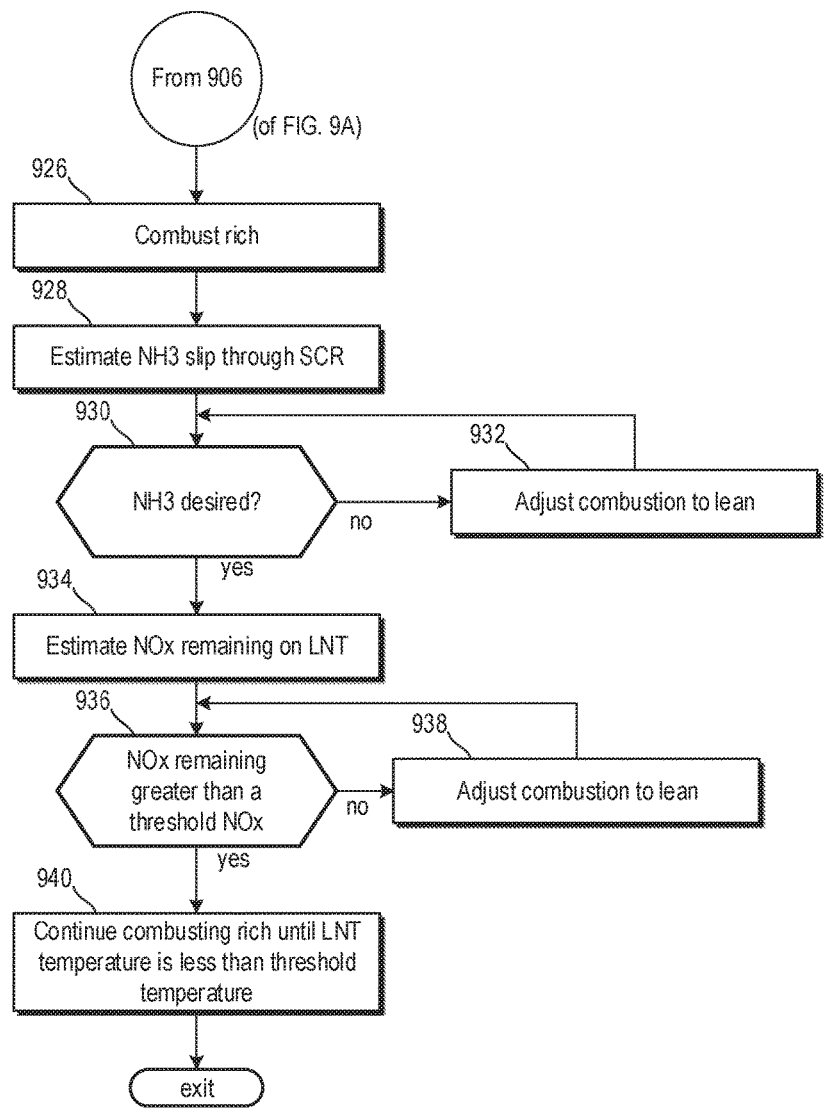

Continuing to FIG. 8, a schematic diagram showing one cylinder of a multi-cylinder engine 13 in an engine system 100, which may be included in a propulsion system of an automobile, is shown. The engine system 100 may be used substantially similarly to the arrangement 1 of FIGS. 1 and 2. The engine 13 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 13 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 13.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 13.

An exhaust gas sensor 126 is shown coupled to the exhaust passage 48 upstream of an emission control device 68 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The emission control device 68 is shown arranged along the exhaust passage 48 downstream of the exhaust gas sensor 126 and EGR passage 152. The device 68 may be a particulate filter, TWC, $NO_x$ trap, SCR, or the like. The device 68 is a lean $NO_x$ trap (LNT), in one example. In some examples, the lean $NO_x$ trap 68 is close-coupled to the engine 13 such that a temperature of the trap 68 is substantially equal to a temperature of exhaust gas directly downstream of the engine 13.

An optional emission control device 70 may arranged downstream of the first emission control device 68. In one example, the optional emission control device 70 is substantially identical to the first emission control device 68. As such, the exhaust passage 48 may comprise a first LNT 68 close-coupled to the engine 13, and a second LNT 70 arranged further downstream of the engine 13. As such, the second LNT 70 may be less hot than the first LNT and experience fewer temperature fluctuations than the first LNT.

A third emission control device 72 may arranged in the exhaust passage 48 downstream of the first 68 and second 70 LNTs. The third emission control device 72 may be a TWC, particulate filter, LNT, DOC, and SCR. In one example, the third emission control device 72 is an SCR. The SCR 72 may be configured to adsorb reductant in an exhaust gas flow and reduce $NO_x$ emissions. The SCR 72 may have a honeycomb structure for exhaust gas to flow therethrough while allowing components of the SCR to react with $NO_x$ in the exhaust gas flow.

The exhaust passage 48 may further include one or more temperature sensors and exhaust gas composition sensors located directly downstream of each of the first LNT 68, second LNT 70, and SCR 72. The controller receives signals from the various sensors of FIG. 8 and employs the various actuators of FIG. 8 to adjust engine operation based on the received signals and instructions stored on a memory of the controller. For example, adjusting an air/fuel ratio of the engine may include adjusting an injection volume of the fuel injector 66 in response to a temperature of the first LNT being greater than a threshold temperature, as will be described below. The injector 66 operation may be further adjusted in response to further conditions of the first LNT 68, second LNT 70, and/or SCR 72.

The controller 12 is shown in FIG. 8 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 13, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

As described above, FIG. 8 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures graphically represent code to be programmed into the computer readable storage medium in controller 12 to be carried out by the controller in combination with the engine hardware, as illustrated in FIG. 8.

In some examples, the vehicle may be a hybrid vehicle with multiple sources of torque available to one or more vehicle wheels 25. In other examples, vehicle is a conventional vehicle with only an engine, or an electric vehicle with only electric machine(s). In the example shown, vehicle includes engine 13 and an electric machine 22. Electric machine 22 may be a motor or a motor/generator. Crankshaft 40 of engine 13 and electric machine 22 are connected via a transmission 24 to vehicle wheels 25 when one or more clutches 26 are engaged. In the depicted example, a first clutch 26 is provided between crankshaft 40 and electric machine 22, and a second clutch 26 is provided between electric machine 22 and transmission 24. Controller 12 may send a signal to an actuator of each clutch 26 to engage or disengage the clutch, so as to connect or disconnect crankshaft 40 from electric machine 22 and the components connected thereto, and/or connect or disconnect electric machine 22 from transmission 24 and the components connected thereto. Transmission 24 may be a gearbox, a planetary gear system, or another type of transmission. The powertrain may be configured in various manners including as a parallel, a series, or a series-parallel hybrid vehicle.

Electric machine 22 receives electrical power from a traction battery 28 to provide torque to vehicle wheels 25. Electric machine 22 may also be operated as a generator to provide electrical power to charge battery 28, for example during a braking operation.

Turning now to FIGS. 9A, 9B, and 9C, they show a method for adjusting the AFR in response $NO_x$ store on the LNT and/or $NH_3$ slip through the SCR based on a temperature of the LNT. Instructions for carrying out method 900 may be executed by a controller based on instructions stored on a memory of the controller and in conjunction with signals received from sensors of the engine system, such as the sensors described above with reference to FIGS. 1, 2, and 8. The controller may employ engine actuators of the engine system to adjust engine operation, according to the methods described below.

The method 900 begins at 902, where the method includes determining, estimating, and/or measuring current engine operating parameters. The current engine operating parameters may include but are not limited to one or more of an engine temperature, engine speed, manifold vacuum, throttle position, EGR flow rate, pedal position, exhaust gas temperature, and air/fuel ratio (AFR).

At 904, the method may include determining a LNT temperature. The temperature may be estimated based on the exhaust gas temperature. The two temperatures may be substantially similar due to the LNT being close-coupled to the engine, in one example. Additionally or alternatively, a temperature sensor may be located directly upstream of, downstream of, or integrated into the LNT. Feedback from the sensor may be used to determine a temperature of the LNT.

At 906, the method may include comparing the LNT temperature to a threshold temperature. The threshold temperature may be based on a temperature of the LNT where $NO_x$ slip may occur. Additionally or alternatively, LNT temperatures above the threshold temperature may correspond to a torque request being greater than a threshold torque request. The threshold torque request may correspond to a high-load and/or accelerator pedal tip-in, where exhaust gas temperatures exceed the threshold temperature. In one example, the threshold temperature is greater than 550° C. If the temperature is not greater than the threshold temperature, then the method may proceeds to 908 of FIG. 9B.

FIG. 9B represents a first condition of the present disclosure wherein a temperature of the LNT is less than the threshold temperature. As such, the LNT may efficiently capture $NO_x$ or at the very least, the LNT is not passively releasing previously captured $NO_x$. The torque demand is less than a threshold torque demand, and as such, an engine load is a mid-load, a low-load, or idle.

For example, if a vehicle is operating in a first condition where the LNT temperature is less than a threshold temperature, then a controller may determine a variety of conditions correlated to the LNT and the SCR based on feedback from sensors arranged proximal to the SCR and LNT. For example, a $NO_x$ store in the LNT may be estimated based on an exhaust gas sensor located directly downstream of the LNT. If the $NO_x$ store is greater than an upper threshold $NO_x$, then the LNT may be fully loaded with $NO_x$ (e.g., 95% or more of a 100% capacity) and unable to store more. As such, a regeneration of the LNT may be desired, wherein the regeneration includes combusting rich.

Additionally or alternatively, combustion may be adjusted to a rich combustion in response to an SCR $NH_3$ load being less than a threshold $NH_3$ load. $NH_3$ slip through the SCR, which may be indicative of the SCR $NH_3$ load, may be estimated based on an exhaust gas sensor located directly downstream of the SCR. Thus, if an $NH_3$ slip is less than a threshold slip, then the SCR may comprise an amount of $NH_3$ less than the threshold $NH_3$ load. In this way, a combustion AFR may be adjusted from lean to rich in response to an SCR $NH_3$ demand and/or an LNT regeneration request.

However, combustion may be shifted from rich to lean, or maintained lean, if the $NH_3$ slip through the SCR is greater than the threshold slip or if the LNT does not demand regeneration. In one example, if the LNT demands regeneration and the $NH_3$ slip is less than the threshold slip, then the AFR may be maintained lean. As such, $NO_x$ may slip through the LNT and flow to the SCR where it is reduced, thereby consuming $NH_3$. Once the $NH_3$ slip decreases to less than the threshold slip, the AFR may be switched to rich to decrease $NO_x$ in the LNT while also providing $NH_3$ to the SCR.

At 908, the method 900 may include combusting lean (e.g., above stoichiometric). In one example, the combustion is slightly lean or equal to stoichiometric (e.g., AFR equal to 15 or lambda value equal to 1.0). As such, a relatively small amount $NO_x$ may be generated compared to more lean AFRs, which may be captured by the LNT or reduced on the SCR. Furthermore, by operating the AFR at or above stoichiometric, the LNT is not regenerated. As such, ammonia does not flow to the SCR downstream of the LNT.

At 910, the method includes estimating an amount of $NO_x$ stored on the LNT. This may include estimating the $NO_x$ store based on feedback from an exhaust gas sensor located directly downstream of the LNT. Additionally or alternatively, the $NO_x$ stored may be estimated based values stored in a multi-input look-up table and a model tracking $NO_x$ capture and removed from the LNT over time based on values in the table.

At 912, the method may include determining if the LNT desires a regeneration. This may include comparing the $NO_x$ stored on the LNT to an upper threshold $NO_x$. The upper threshold $NO_x$ may be based on a fully loaded LNT (e.g., >95% loading of $NO_x$ on the LNT). If the $NO_x$ stored on the LNT is greater than the upper threshold $NO_x$, then the LNT may be unable to further store $NO_x$ and may demand a regeneration. If the $NO_x$ stored on the LNT is less than the upper threshold $NO_x$, then the LNT may be able to store more $NO_x$ and may not demand a regeneration. If the method 900 determines that the $NO_x$ stored on the LNT is greater than the upper threshold $NO_x$, then the method may proceed to 914 to combustion rich (e.g., sub-stoichiometric) and regenerate the LNT. In this way, the method may inject more fuel into one or more cylinders of the engine at 914 than at 908 for the same amount of intake gas (e.g., air or a mixture of air and exhaust gas). In one example, combusting rich produces a lambda value substantially equal to a value between 0.4 to 0.6 or an AFR value between 6 to 10. By combusting rich, more hydrogen, hydrocarbons, and carbon oxides flow to the LNT, which may assist in reducing $NO_x$ stored thereon to $NH_3$. This may synergistically coat surface of the SCR downstream of the LNT with $NH_3$. Thus, $NO_x$ stored on the LNT is reduced and the LNT is regenerated.

If the $NO_x$ stored on the LNT is less than the upper threshold $NO_x$ or if the $NO_x$ stored on the LNT has been decreased to an amount of $NO_x$ less than the threshold $NO_x$, then the method 900 may proceed to 916 to estimate $NH_3$ slip through the SCR. $NH_3$ slip through the SCR may be estimated based on feedback from an exhaust gas sensor located directly downstream of the SCR. The $NH_3$ slip may be proportional to an $NH_3$ load of the SCR, wherein as the slip increases, the $NH_3$ load of the SCR also increases.

At 918, the method may include determining if the SCR desires $NH_3$. $NH_3$ may not be desired if the $NH_3$ slip is greater than a threshold slip. The threshold slip may be based on a slip corresponding to an SCR device having an $NH_3$ load equal to 95% or greater of its storage capacity. If the $NH_3$ is not desired and the $NH_3$ slip is less than the threshold slip, then the method may continue to 920 to continue combusting above stoichiometric. In this way, the AFR may be operated based on increasing vehicle efficiency and is not altered based on LNT or SCR conditions.

In some examples, the $NH_3$ slip may be greater than the threshold slip while the LNT demands a regeneration. Thus, the LNT may desire a rich AFR while the SCR may desire a lean AFR. In such an example, the AFR may be lean, thereby producing at least some $NO_x$, wherein the $NO_x$ reacts with $NH_3$ at the SCR device. This may decrease $NH_3$ slip through the SCR, and as a result, the AFR may be switched to rich once the $NH_3$ slip is less than the threshold slip. This allows the LNT to be regenerated while synergistically providing $NH_3$ to the SCR device. Additionally, fuel consumption may be reduced while also increasing utilization of $NO_x$ conversion into $NH_3$.

It will be appreciated by those skilled in the art that in some examples where the $NH_3$ slip may be greater than the threshold slip while the LNT demands a regeneration, the AFR may be adjusted to rich. As one example, if the SCR is not lit-off and is unable to treat $NO_x$ output, then the AFR may be adjusted to rich to mitigate $NO_x$ emissions.

If the $NH_3$ slip is less than the threshold slip, then the SCR may desire more $NH_3$ and the method may proceed to 922 to combust rich. By doing this, $NO_x$ from the LNT upstream of the SCR is reduced to $NH_3$ and directed to the SCR, where the $NH_3$ may adsorb onto surfaces of the SCR.

At 924, the method includes continuing to monitor $NO_x$ store of the LNT and $NH_3$ slip through the SCR. The combustion AFR may cycle between above stoichiometric and sub-stoichiometric based on sensed conditions of the LNT and/or SCR. For example, if the $NO_x$ store on the LNT is less than a lower threshold $NO_x$ store and/or if the $NH_3$ slip is greater than a threshold $NH_3$ slip, then the AFR may be adjusted to a stoichiometric or slightly lean AFR.

Returning to 906, if the LNT temperature is greater than the threshold temperature, then the LNT may not be able to efficiently store $NO_x$. The method may proceed to 926 of FIG. 9C.

FIG. 9C shows a portion of the method 900 for an engine of a vehicle operating in a second condition. The second condition may include where a torque request is greater than a threshold torque request, wherein the threshold torque request is based on an exhaust gas temperature high enough to heat the LNT to greater than the threshold temperature. During the second condition, the LNT may be unable to store $NO_x$, and as a result, $NO_x$ may flow through the LNT and be passively released from the LNT. However, during the second condition, the engine is adjusted to combust rich in response to the torque request above the threshold torque request to reduce at least some of the $NO_x$ stored on the LNT to $NH_3$. This allows the $NO_x$ and $NH_3$ flowing out of the LNT to be reduced at the SCR located downstream of the LNT.

For example, if a vehicle is operating in a second condition, the controller may receive feedback from one or more sensors associated with the LNT and the SCR, thereby estimated $NO_x$ stored on the LNT and $NH_3$ stored on the SCR. As the $NO_x$ on the LNT are reduced due to rich combustion, the $NH_3$ stored on the SCR increases, thereby increasing $NH_3$ slip through the SCR. If the $NH_3$ slip through the SCR increases beyond the threshold slip, then the AFR may be adjusted to stoichiometric or lean. This may increase fuel economy while also preserving $NO_x$ stored on the LNT for future reductant adsorption. The AFR may be adjusted back to rich from lean in response the $NH_3$ slip through the SCR decreasing to a slip less than the threshold slip and the SCR is capable of storing more $NH_3$. In this way, $NO_x$ stored on the LNT is utilized for flowing $NH_3$ during the second condition so as to reduce fuel consumption and decrease $NH_3$ slip due to $NO_x$ reduction into $NH_3$.

At 926, the method may include combusting rich. For a given amount of intake gas fed into a combustion chamber, rich combustion include more fuel for the given amount than stoichiometric and lean combustions. Thus, exhaust gas during the rich combustion may comprise a greater amount of carbon oxides, hydrocarbons, and hydrogen gas than lean combustion. These constituents may promote the reduction of $NO_x$ into $NH_3$ on surfaces of the LNT. Thus, the LNT may passively release $NO_x$ due to its temperature being greater than the threshold temperature, while also releasing $NH_3$ due to the rich combustion.

At 928, the method includes estimate $NH_3$ slip through the SCR. The SCR may become saturated with $NH_3$ and $NH_3$ slip may surpass the threshold slip, as described above.

At 930, the method includes determining if the SCR desired $NH_3$. The SCR may desire $NH_3$ if the $NH_3$ slip through the SCR is less than the threshold slip, thereby indicating the SCR may be capable of storing more $NH_3$. If more $NH_3$ is not desired, and the SCR is saturated with $NH_3$ such that the amount of $NH_3$ slipping through the SCR is greater than the threshold slip, then the method may proceed to 932 to adjust combustion AFR to lean. This may decrease output of carbon oxides, hydrocarbons, and hydrogen gas, while increasing $NO_x$ output. By doing this, some amount of $NO_x$ may be released from the engine in combination with $NO_x$ released from the LNT. $NH_3$ on the SCR is thereby used to reduce the $NO_x$, thereby decreasing $NH_3$ slip through the SCR. The method may continue to monitor $NH_3$ slip through the SCR.

If $NH_3$ slip is less than the threshold slip and $NH_3$ is desired, then the method may proceed to 934 to estimate $NO_x$ stored on the LNT. At 936, the method may include determining if the $NO_x$ remaining is greater than a lower threshold $NO_x$. The lower threshold $NO_x$ may be based on an amount of $NO_x$ stored on the LNT being equal to 5% or less of a full storage capacity of the LNT. As such, the LNT may no longer be able to sufficiently produce $NH_3$, even under rich combusting conditions. If the $NO_x$ remaining is less than the lower threshold $NO_x$, then the method may proceed to 938 to adjust combustion to lean. This may increase fuel economy.

If the $NO_x$ remaining is greater than the lower threshold $NO_x$, then the LNT comprises a sufficient amount of $NO_x$ to convert into $NH_3$ to supply to the SCR and the method may proceed to 940. The combustion may be maintained rich until one or more of the LNT temperature decreases to a temperature less than the threshold temperature, the $NO_x$ remaining on the LNT is less than the lower threshold $NO_x$, and $NH_3$ slip through the SCR exceeds the threshold slip.

In one example, during the second condition, where the $NO_x$ stored on the LNT does not fall below the lower threshold $NO_x$, the AFR may oscillate between lean and rich based on $NH_3$ demands of the SCR. Thus, when the $NH_3$ slip is less than the threshold slip, the AFR may be rich. When the $NH_3$ slip is greater than the threshold slip, the AFR may be lean. In some examples, during the second condition where $NH_3$ is not desired, the AFR may be adjusted from rich (lambda between 0.4 to 0.6) to less rich (lambda between 0.7 to 0.9). Additionally or alternatively, the AFR may be adjusted from more rich to lean (lambda between 1.1 to 1.3). For example, if a lambda value at 926 is equal to 0.5 for rich combustion, then the lambda value of a less rich combustion may be equal to 0.8. As such, less $NO_x$ may be converted into $NH_3$ while also mitigating output of $NO_x$ from the engine. Additionally or alternatively, during the second condition where $NH_3$ is not desired, the AFR may be adjusted to stoichiometric. This may decrease fuel consumption while also mitigating engine $NO_x$ output.

It will be appreciated by those skilled in the art that while the method 900 is described in reference to an exhaust system having a single LNT, close-coupled to an engine, upstream of a SCR device, the method may also be applied to an exhaust system having two LNTs upstream of the SCR device. As described above, the LNT closest to the engine (e.g., the first LNT) may experience the greatest fluctuations in temperatures, and as such, an AFR of the engine may be adjusted based on a temperature of the first LNT. However, conditions of the second LNT may be used to enhance the benefits described above.

For example, during the second condition, if the first LNT does not demand a regeneration and the SCR does not desire $NH_3$, then the method may adjust the AFR from more rich (lambda similar to 0.5) to less rich (lambda similar to 0.8). This may result in the first LNT to leak $NO_x$ to the second LNT, which may be at a temperature less than the threshold temperature during the second condition. This may be due to a distance between the second LNT and the engine. As such, the second LNT may capture $NO_x$ leaked by the first LNT. Additionally or alternatively, if the vehicle has been operating in the second condition for an amount of time sufficient to heat both the first and second LNTs to temperatures greater than the threshold temperature, and neither the first nor second LNTs desire a regeneration and the SCR does not desire $NH_3$, then the method may adjust the AFR from more rich to less rich. Since both LNTs leak $NO_x$ during this time, the $NH_3$ in the SCR is consumed and the AFR may be adjusted back to a more rich AFR in response to $Nh_3$ slip through the SCR being less than the threshold slip. Cycling the AFR back and forth between more rich and less rich may increase fuel economy while increasing $NH_3$ flow efficiency to the SCR.

Figure 10:
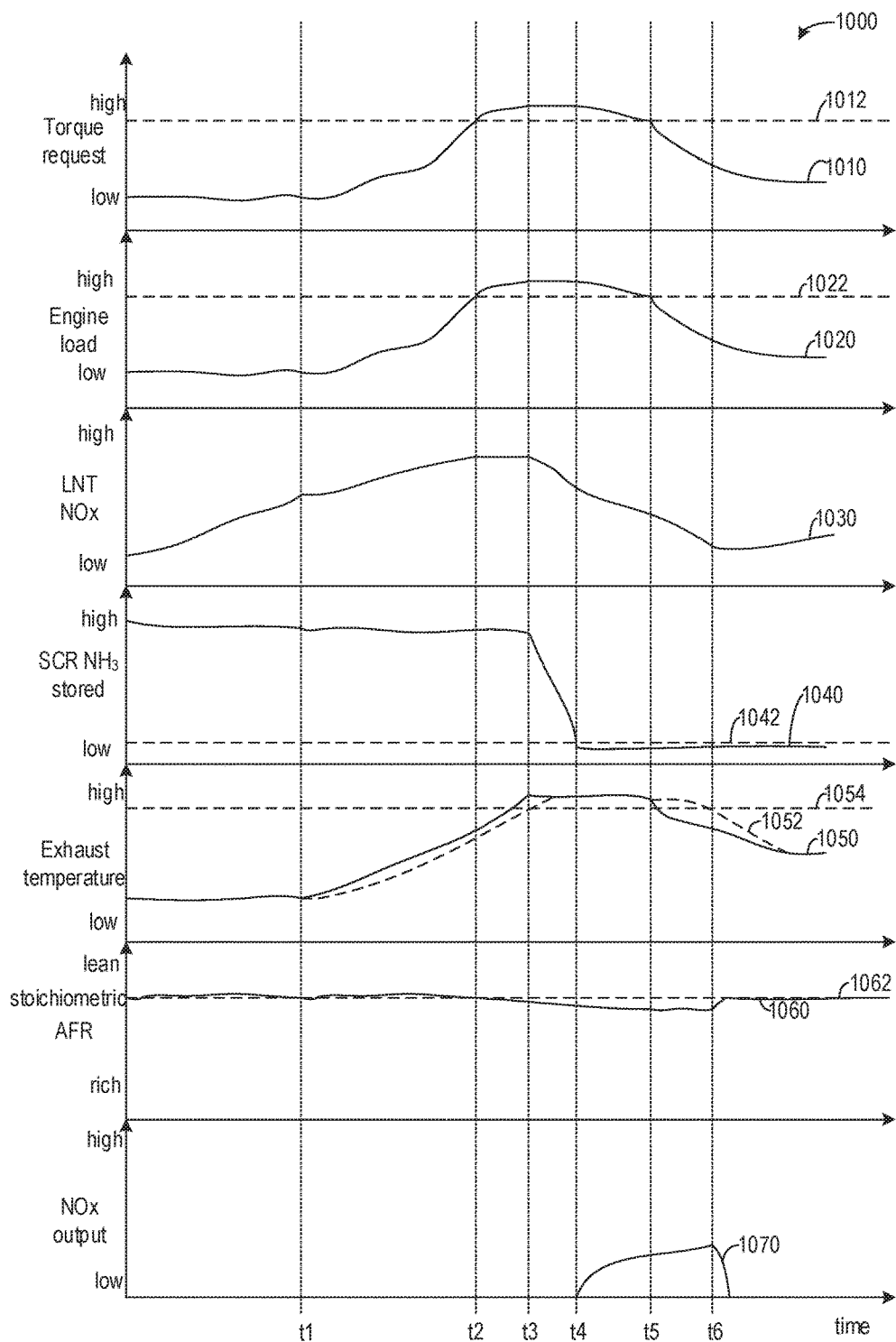
FIG. 10 shows an operating sequence for an engine not implementing the method of FIGS. 9A-9C.

Turning now to FIG. 10, it shows an engine operating sequence 1000 graphically illustrating an engine operating shifting from a first condition to a second condition for an engine operating slightly rich following the increased torque request. Thus, plot 1000 illustrates conditions for an engine comprising an exhaust system having an LNT that is not close coupled to the engine, further comprising a controller not having instructions for the execution of method 900 of FIG. 9A. Plot 1010 shows a torque request and dashed line 1012 shows a threshold torque, plot 1020 shows an engine load and dashed line 1022 shows a threshold load, plot 1030 shows $NO_x$ stored on the LNT and dashed line 1032 shows the lower threshold $NO_x$, plot 1040 shows $NH_3$ stored on the SCR and dashed line 1042 shows the threshold $NH_3$ load, plot 1050 represents an exhaust gas temperature, dashed plot 1052 represents the LNT temperature, and dashed line 1054 represents the threshold temperature, plot 1060 represents an air/fuel ratio and dashed line 1062 represents a stoichiometric air/fuel ratio, and plot 1070 represents $NO_x$ output to an ambient atmosphere outside of the vehicle. For instances where the dashed plot 1052 is not visible, it may be assumed that the temperature of the LNT is substantially equal to the exhaust temperature. The threshold torque request and the threshold engine load are both based on engine operations which may increase the exhaust gas temperature, and thereby the LNT temperature, to temperatures above the threshold temperature. Time increases from a left to a right side of the figure.

Prior to t1, the torque request (1010) and the engine load (1020) are below their respective thresholds (1012 and 1022). Thus, the exhaust temperature and LNT temperature (1050 and 1052, respectively) are both below the threshold temperature (1054). The AFR (1060) is substantially stoichiometric and/or slightly lean. As a result, the LNT $NO_x$ (1030) stored thereon increases toward a relatively high $NO_x$. The $NH_3$ stored on the SCR (1040) is relatively with high and above the threshold $NH_3$ stored (1042). The $NO_x$ output is relatively low or substantially zero.

At t1, the engine load and torque request begin to increase. After t1 and prior to t2, the engine load and torque request continue to increase. The exhaust temperature and LNT temperature begin to increase. The LNT $NO_x$ stored continues to increase.

At t2, the engine load and torque request are substantially equal to or greater than their corresponding thresholds. In one example, an accelerator pedal being depressed passed a threshold position corresponds to the torque request above the threshold torque request. The air/fuel ratio is adjusted to be slightly rich. Slightly rich may correspond to an AFR of 12.5-13.5 or to a lambda value of 0.8 to 0.9. After t2 and prior to t3, the exhaust gas temperature increases to a temperature greater than the threshold temperature.

At t3, the LNT temperature exceeds the threshold temperature. As such, the LNT $NO_x$ begins to decrease. This results in the SCR $NH_3$ stored correspondingly decreasing. However, due to the AFR only being slightly rich, only a small amount, if any, of the $NO_x$ stored on the LNT is converted to $NH_3$. Between t3 and t4, the SCR $NH_3$ stored decreases rapidly toward the threshold $NH_3$ stored. Likewise, the LNT $NO_x$ decreases.

At t4, the SCR $NH_3$ is less than the threshold $NH_3$ and is unable to treat $NO_x$ released by the LNT. As such, $NO_x$ output begins to rise from relatively zero to a value between relatively high and low values. Between t4 and t5, the engine load and torque request remain above their relative thresholds. The exhaust gas temperature and LNT temperature remain greater than the threshold temperature and the AFR remains slightly rich. The LNT $NO_x$ continues to decrease and contributes to the $NO_x$ output to the ambient atmosphere.

At t5, the torque request and engine load fall below their respective thresholds. Between t5 and t6, the exhaust gas temperature decreases and falls below a temperature less than the threshold temperature. However, due to the distance between the LNT and the engine, the LNT temperature does not fall below the threshold temperature until after a duration of time. Thus, $NO_x$ continues to be released by the LNT and the AFR remains slightly rich to mitigate $NO_x$ emissions to the ambient atmosphere. This may decrease vehicle fuel economy.

At t6, the LNT temperature falls below the threshold temperature and the LNT no longer releases $NO_x$. As such, the $NO_x$ output begins to decrease. The AFR is increased toward stoichiometric. As such, less fuel is delivered to the engine. After t6, the $NO_x$ output decreases to substantially zero. The AFR is substantially equal to stoichiometric. The SCR $NH_3$ store remains below the threshold $NH_3$ store. The LNT $NO_x$ increases. The torque request and the engine load remain below their respective thresholds.

Figure 11:
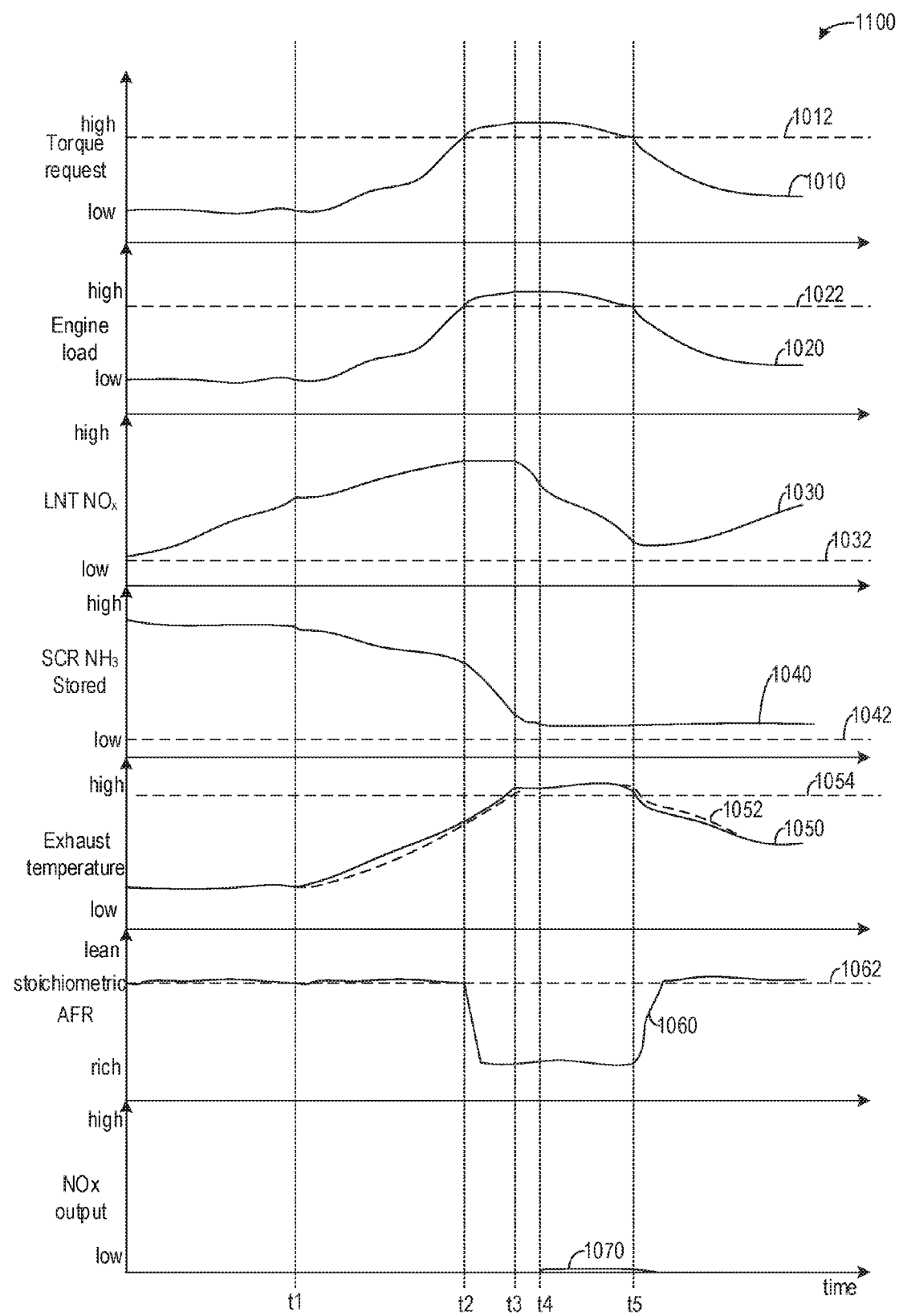
FIGS. 11-12 show operating sequences for an engine implementing the method of FIGS. 9A-9C.

Turning now to FIG. 11, it shows an operating sequence 1100 illustrating an engine having a closed coupled LNT along with a controller with instructions for executing the method 900 of FIG. 9A switching from a first condition to a second condition. Operating sequence 1100 is therefore substantially similar to the operating sequence 1000 of FIG. 10, apart from differences described here. Thus, plots previously introduced are similarly numbered and may not be reintroduced. Dashed line 1032 relates to a lower threshold $NO_x$ as described above in FIG. 9A.

As shown between t1 and t2, the exhaust gas temperature and LNT temperature increase as the engine load and the torque request increase. A difference between the exhaust gas temperature and the LNT temperature of operating sequence 1100 is less than a difference between the exhaust temperature and the LNT temperature of operating sequence 1000. This may be due to the LNT being closed coupled in the system being graphically displayed by operating sequence 1100.

The torque request and engine load surpass their respective thresholds at t2 and the AFR is rich. However, the rich operation described herein is richer than the AFR described in FIG. 10. Thus, for the same amount of air, the AFR in FIG. 11 has more fuel than the AFR of FIG. 10.

At t3, the LNT temperature reaches the threshold temperature, the LNT $NO_x$ decreases. However, due to the more rich AFR, the $NO_x$ flow to the SCR also comprises $NH_3$. As such, during the entire operation of the LNT with its temperature above the threshold temperature between t3 and t5, the SCR $NH_3$ stored does not fall below the threshold $NH_3$ stored. In this way, the SCR may sufficiently treat $NO_x$ leakage from the LNT, as shown by $NO_x$ output in FIG. 11 being lower than $NO_x$ output in FIG. 10.

Figure 12:
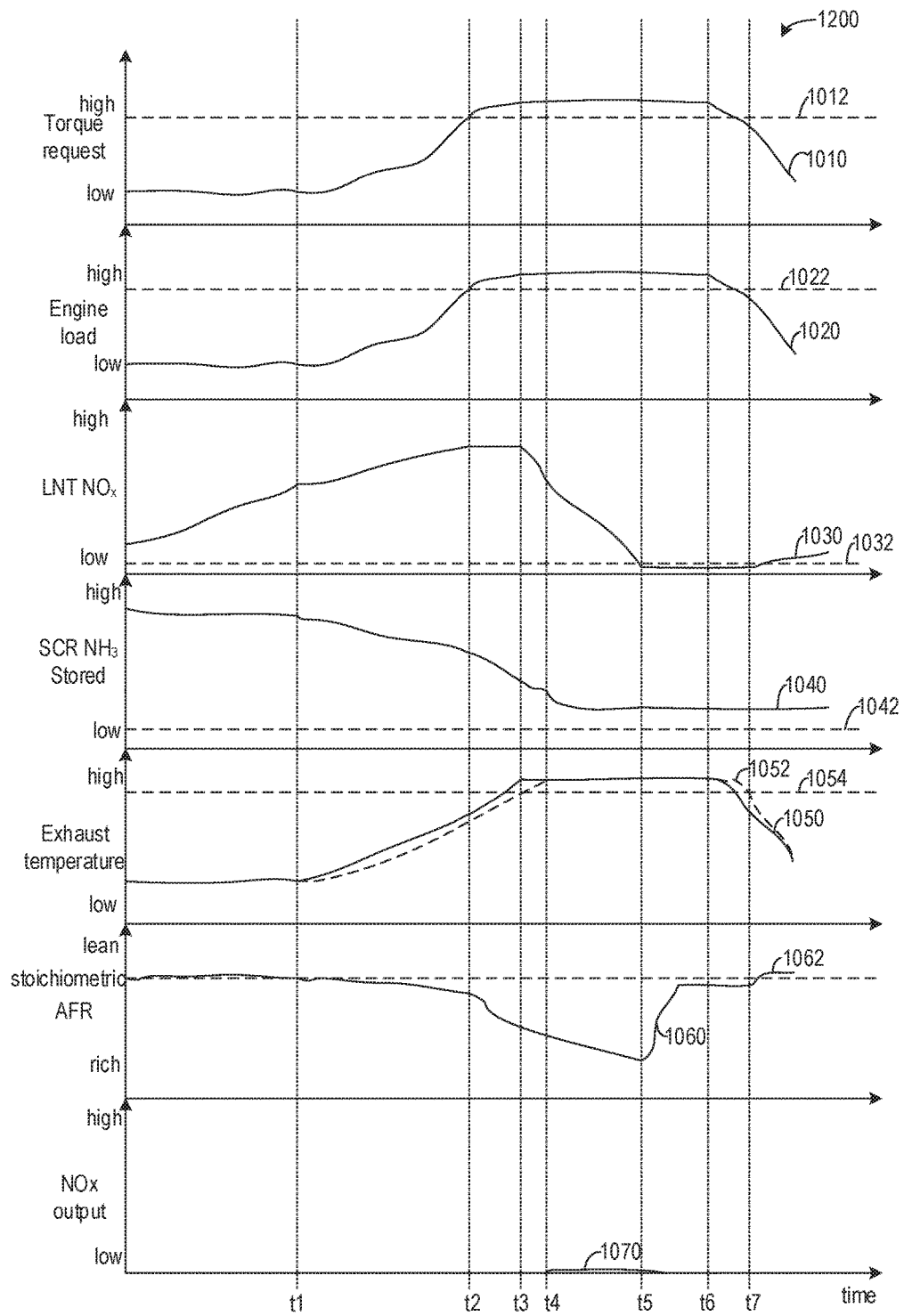

Turning now to FIG. 12, it shows an operating sequence 1200, which is substantially similar to the operating sequence 1100. However, the torque request remains above the threshold torque request for a duration of time greater than the time in FIG. 11. As such, more $NO_x$ is leaked from the LNT than in FIG. 11. As such, the LNT $NO_x$ falls below the lower threshold $NO_x$, thereby indicating that the LNT $NO_x$ does not comprise a sufficient amount of $NO_x$ capable of being reduced to $NH_3$. As such, to preserve a $NH_3$ load of the SCR, the AFR is adjusted to a slightly rich AFR between t5 and t6. The slightly rich AFR may be substantially similar to the slightly rich AFR shown in FIG. 10 between t4 to t6. As such, $NO_x$ production by the engine is mitigated while also decreasing $NH_3$ consumption in the SCR.

Figure 13:
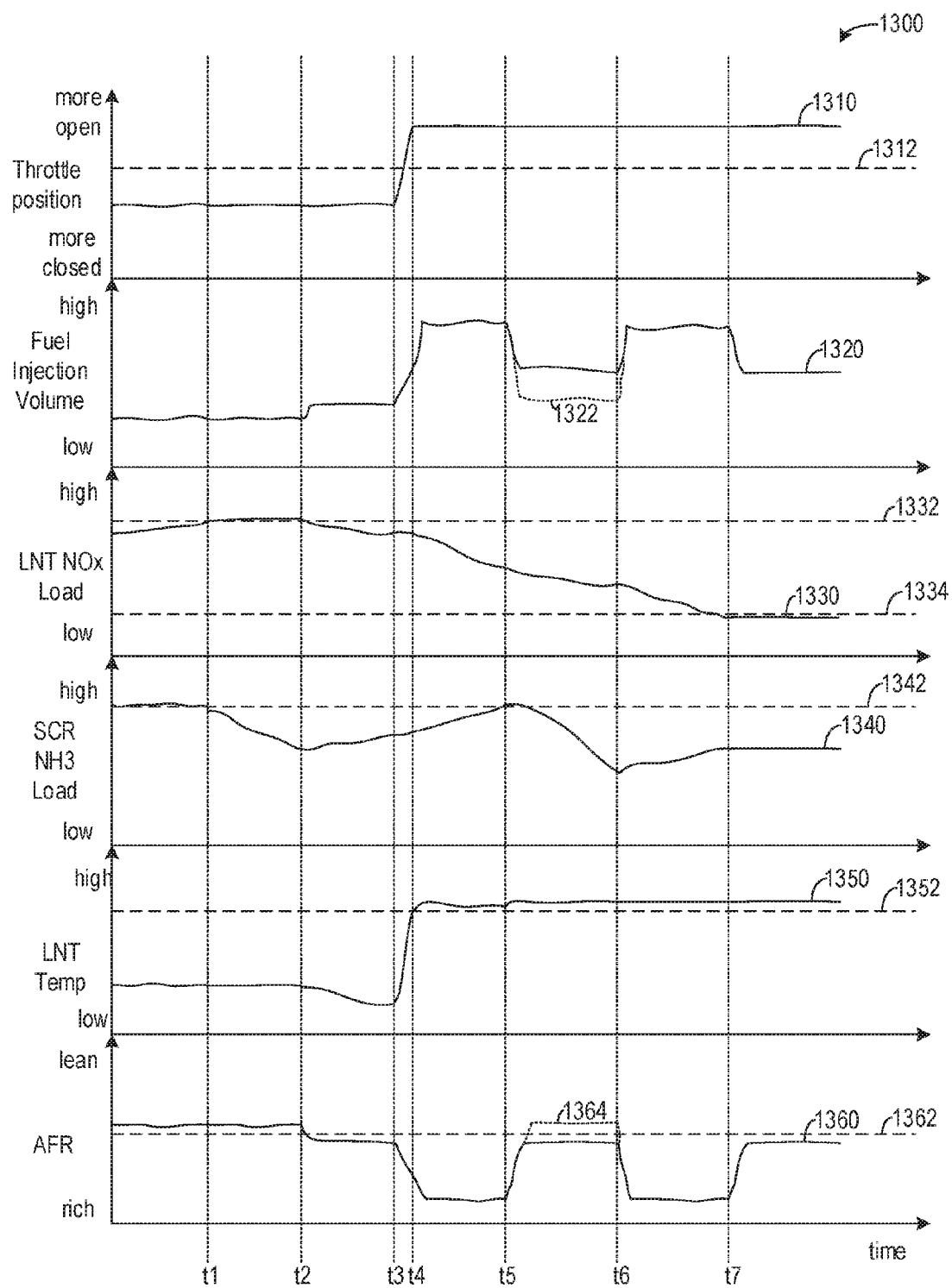
FIG. 13 shows an operating sequence for an engine switching from a first condition to a second condition.

Turning now to FIG. 13, it shows an operating sequence 1300 illustrating an engine switching from the first condition to a second condition. In one example, operating sequence graphically displays the engine 13 of FIG. 8 conducting the method 900. Plot 1310 shows a throttle position and dashed line 1312 illustrates a throttle position corresponding to an engine load greater than the threshold load, plot 1320 shows a fuel injection volume, plot 1330 shows an LNT $NO_x$ load, dashed line 1332 shows an upper threshold $NO_x$ load, and dashed line 1334 shows a lower threshold $NO_x$ load, plot 1340 shows SCR $NH_3$ load, dashed line 1342 shows a threshold SCR $NH_3$ load, plot 1350 shows a LNT temperature and dashed line 1352 shows a threshold temperature, and plot 1360 shows an AFR and dashed line 1362 shows a stoichiometric AFR. As described above, the threshold engine load corresponds to one or more of a torque request being greater than the threshold torque request and the LNT temperature being greater than the threshold temperature. Thus, when the throttle moves to a more open position past the threshold position, exhaust gas temperature may rise above the threshold temperature. The upper threshold $NO_x$ load corresponds to the LNT being saturated with $NO_x$ and no longer able to adsorb more $NO_x$. The lower LNT $NO_x$ load corresponds to the LNT being substantially empty (e.g., 5% or less of the surfaces of the LNT comprise $NO_x$ adsorbed thereon). The threshold $NH_3$ load corresponds to an SCR being saturated with $NH_3$ such that $NH_3$ is no longer desired at the SCR. Said another way, $NH_3$ slip through the SCR is substantially equal to a threshold slip when the SCR $NH_3$ load is substantially equal to or greater than the threshold $NH_3$ load. The stoichiometric AFR is substantially equal to an AFR of 15 and/or a lambda of 1.0. Time increases from a left to a right side of the figure.

Prior to t1, the throttle position (1310) is less open than the threshold position (1312). Thus, the LNT temperature (1350) is less than the threshold LNT temperature (1352). As such, the engine may be operating in a first condition wherein the LNT is configured to capture $NO_x$. The AFR (1360) is above stoichiometric (1362) and slightly lean. As such, the fuel injection volume is relatively low. Due to the excess of oxygen, $NO_x$ may be generated by the engine and captured by the LNT. As such, the LNT $NO_x$ load (1330) increases toward the upper threshold $NO_x$ load (1332). The SCR $NH_3$ load (1340) remains substantially constant, below the threshold $NH_3$ load (1342), since the LNT may capture most the $NO_x$ output from the engine.

At t1, the LNT $NO_x$ reaches the upper threshold $NO_x$ load. As such, the LNT may request a regeneration. However, since the SCR $NH_3$ load is still below the threshold $NH_3$ load, the regeneration is delay. This allows $NO_x$ conversion into $NH_3$ to be utilized during conditions where the SCR also demands $NH_3$. Thus, the fuel injection is not increased and the AFR remains substantially lean.

Between t1 and t2, the throttle position remains in a position more closed than the threshold position. The fuel injection volumes remains relatively low. The LNT $NO_x$ load remains above the upper threshold $NO_x$ load. The SCR $NH_3$ load decreases to a load less than the threshold $NH_3$ load as it treats $NO_x$ emitted by the engine due to the lean AFR. The LNT temperature remains less than the threshold temperature.

In some embodiments, the LNT may be regenerated even when the SCR does not demand $NH_3$. This may occur if the SCR is not lit-off and may not treat $NO_x$ emissions. Additionally or alternatively, the LNT may be passively regenerated by a rich AFR, wherein the AFR is switched to rich due to one or more engine operating parameters (e.g., increased engine load).

At t2, the throttle position remains substantially constant at a position more closed than the threshold position. However, the fuel injection volume increases to regenerate the LNT. As such, the AFR moves toward a slightly rich AFR (e.g., AFR 12.5). The LNT temperature may slightly decrease from the temperature prior to t2 due to a decrease of oxygen in the exhaust flow. The LNT $NO_x$ load decreases and the SCR $NH_3$ load begins to increase. Between t2 and t3, the LNT $NO_x$ load decreases to a load less than the upper threshold $NO_x$ load and the SCR $NH_3$ load increases toward the threshold $NH_3$ load. Although the LNT no longer demands a regeneration, the regeneration may continue for a threshold duration based on a saturation of the LNT being less than 50%, in one example.

At t3, the throttle position begins to move to a more open position. The fuel injection volume begins to increase and the AFR becomes richer. Between t3 and t4, the throttle position moves to a position more open than the threshold position. As such, the LNT temperature continues to increase. The fuel injection volume is relatively high and the AFR continues to decrease, becoming richer. In this way, the engine is transitioning from the first condition to the second condition. The LNT $NO_x$ load continues to decrease and the SCR $NH_3$ load continues to increase due to the conversion of $NO_x$ to $NH_3$ at the LNT.

At t4, the LNT temperature is greater than the threshold temperature and the second condition is initiated. As such, the LNT may passively leak $NO_x$ and may no longer capture and/or adsorb $NO_x$. The LNT $NO_x$ load continues to decrease and the SCR $NH_3$ load continues to increase due to the AFR being richer than during the first condition (e.g., AFR 9 vs AFR 12.5). As such, due to the increased presence of hydrocarbons, carbon oxides, and hydrogen, along with the LNT temperature being greater than the threshold temperature, the LNT $NO_x$ load decreases at a rate greater than a rate prior to t4. Likewise, the SCR $NH_3$ load increases at a rate greater than a rate prior to t4. Between t4 and t5, the LNT $NO_x$ load continues to decrease toward the lower threshold $NO_x$ load (1034) and the SCR $NH_3$ load increases toward the threshold $NH_3$ load. The AFR remains rich and the throttle position remains substantially constant. The fuel injection volume remains relatively high.

At t5, the SCR $NH_3$ load increases above the threshold $NH_3$ load. As such, $NH_3$ slip through the SCR may be greater than the threshold slip. Thus, $NH_3$ is no longer desired. In response, the fuel injection volume decreases and the AFR moves to a less rich AFR. Between t5 and t6, the AFR is slightly rich and may be substantially similar to the AFR between t2 and t3. As such, the AFR may now be substantially equal to 12.5. The LNT $NO_x$ load continues to decrease due to its temperature being greater than the threshold temperature; however, its rate of decrease is less than the rate between t4 and t5. This is due to a decreased presence of hydrogen, hydrocarbons, and carbon oxides during the less rich AFR. The SCR $NH_3$ load begins to decrease. Between t5 and t6, The SCR $NH_3$ load and the LNT $NO_x$ load continue to decrease. The AFR remains less rich and as a result, little to no $NO_x$ is converted to $NH_3$. The SCR $NH_3$ load falls below the threshold $NH_3$ load. Therefore, the SCR may be in a condition configured to store more $NH_3$. By operating the AFR at a less rich AFR than the more rich AFR between t4 and t5, fuel economy may increase and $NO_x$ conversion into $NH_3$ is more efficiently utilized. For example, rather than consuming increased fuel and slipping $NH_3$ to an atmosphere, fuel consumption is decreased and $NH_3$ slip is reduced.

Dashed plots 1322 and 1354 shows alternative fuel injection volumes and AFRs, respectively. In one example, the fuel injection volume may be decreased to a volume corresponding to a lean AFR. As such, the method may alternatively operate lean when the SCR is saturated with $NH_3$ during the second condition. This may further increase fuel economy.

At t6, fuel injection volume increases and the throttle position remains more open than the threshold position. The AFR begins to decrease to a more rich AFR. Between t6 and t7, the LNT $NO_x$ load continues to decrease at a rate similar to between t4 and t5. The SCR $NH_3$ load increases toward the threshold $NH_3$ load. The LNT temperature remains above the threshold temperature.

At t7, the LNT $NO_x$ load decreases to a load less than the lower threshold $NO_x$ load. As such, the LNT comprises little to no $NO_x$. As such, the fuel injection volume decreases and the AFR moves to a less rich AFR. The SCR $NH_3$ load remains substantially constant. This may be due to the LNT not leaking $NO_x$ and the engine combusting slightly rich, which may mitigate or prevent $NO_x$ formation. After t7, the operation may continue in the second condition. Since the LNT is too hot to capture $NO_x$, the AFR may remain less rich for the duration of the second condition until first condition parameters are met, where the LNT may adsorb $NO_x$.

In this way, an AFR may be adjusted based on one or more of a temperature of a LNT, a $NO_x$ load of the LNT, and a $NH_3$ load on a SCR. The LNT and the SCR are in disparate positions in an exhaust passage such that the LNT experiences higher exhaust gas temperatures than the SCR. Thus, during torque requests greater than a threshold torque request, the LNT may reach a temperature where it is no longer able to capture or store $NO_x$. The technical effect of adjusting the AFR based on conditions of the LNT and the SCR is to utilize $NO_x$ stored on the LNT to coat the SCR with $NH_3$ and to regenerate the LNT. By oscillating between more rich, less rich, and lean AFR, fuel economy may increase and utilization of $NO_x$ conversion to $NH_3$ may also increase.

An embodiment of a method comprising adjusting an air/fuel ratio of a combustion engine, the engine comprising an exhaust tract connected fluidly to the combustion engine, two or more exhaust gas aftertreatment devices arranged in the exhaust tract comprising at least one nitrogen oxide storage catalyst, at least one catalyst for selective catalytic reduction arranged downstream of the nitrogen oxide storage catalyst, at least one lambda probe, at least one temperature sensor, and a control unit, operating a combustion engine at low load during a first condition where a torque request is less than a threshold torque request, changing to an operating state with a high load during a second condition where the torque request is greater than the threshold torque request, adjusting the air/fuel ratio from more rich to less rich during the second condition in response to an ammonia load stored in the selective catalytic reduction reaching an upper threshold ammonia load, adjusting the air/fuel ratio from less rich to more rich during the second condition in response to the ammonia load stored in the selective catalytic reduction reaching a lower threshold ammonia load, and adjusting the air/fuel ratio from rich to lean in when switching from the second condition to the first condition in response to the torque request being less than the threshold request.

A first example of the method further includes where the combustion engine oscillates between more rich and less rich air/fuel ratio during the second condition based on the ammonia load reaching the upper and lower threshold ammonia loads, and where the more rich air/fuel ratio is between 6.0 to 9.0 and where the less rich air/fuel ratio is between 12.0 to 13.0, and where reaching of the upper threshold value is determined by detecting ammonia escaping from the catalyst for selective catalytic reduction. A second example of the method, optionally including the first example, further includes where the nitrogen oxide storage catalyst is a first nitrogen oxide storage catalyst, the exhaust tract further comprising a second nitrogen oxide storage catalyst, both the first and second nitrogen oxide storage catalysts are arranged upstream of the selective catalytic reduction. A third example of the method, optionally including the first and/or second examples further includes where the second nitrogen oxide storage catalyst is arranged downstream of the first nitrogen oxide storage catalyst in the flow direction of the exhaust gas. A fourth example of the method, optionally including one or more of the first through third examples, further includes where the first and second conditions are further based on a temperature of the first nitrogen oxide storage catalyst, wherein the first condition is met when the temperature of the first nitrogen oxide storage catalyst is less than a threshold temperature. A fifth example of the method, optionally including one or more of the first through fourth examples, further includes where the first nitrogen oxide catalyst is close-coupled to the engine and located directly downstream of an exhaust manifold. A sixth example of the method, optionally including one or more of the first through fifth examples, further includes where generating ammonia in response to the selective catalytic reduction reaching the lower ammonia load by adjusting the air/fuel ratio to more rich and converting nitrogen oxides stored in the nitrogen oxide storage catalyst into ammonia.

A second embodiment of a method comprising during a first condition where a temperature of a lean $NO_x$ trap is less than a threshold temperature, adjusting an air/fuel ratio in response to the lean $NO_x$ trap demanding a regeneration and an ammonia slip through a selective catalytic reduction device being less than a threshold slip and adjusting the air/fuel ratio in response to one or more of or each of a $NO_x$ load of the lean $NO_x$ trap reaching a lower threshold $NO_x$ load and the ammonia slip through the selective catalytic reduction device reaching the threshold slip during a second condition where the temperature of the lean $NO_x$ trap is greater than the threshold temperature. A first example of the method further includes where the threshold temperature is based on a temperature of the lean $NO_x$ trap where the lean $NO_x$ trap passively leaks $NO_x$ stored thereon. A second example of the method, optionally including the first example, further includes where the lean $NO_x$ trap is configured to capture $NO_x$ generated by an engine during the first condition when the temperature of the lean $NO_x$ trap is less than the threshold temperature and the lean $NO_x$ trap does not demand a regeneration. A third example of the method, optionally including the first and/or second examples further includes where the air/fuel ratio is adjusted to a rich air/fuel ratio in response to the selective catalytic reduction device demanding ammonia and the $NO_x$ load of the lean $NO_x$ trap being greater than the lower threshold $NO_x$ load during the second condition, and where the air/fuel ratio is adjusted to a leaner air/fuel ratio during the second condition in response to the selective catalytic reduction device not demanding ammonia during the second condition. A fourth example of the method, optionally including one or more of the first through third examples, further includes where wherein the rich air/fuel ratio generates a lambda value between 0.4 to 0.6 and the lean air/fuel ratio generates a lambda value between 1.1 to 1.3 during the second condition, where the lambda value is measured by an exhaust gas sensor arranged in an exhaust passage housing the lean $NO_x$ trap and the selective catalytic reduction device. A fifth example of the method, optionally including one or more of the first through fourth examples, further includes where the air/fuel ratio oscillates between the rich air/fuel ratio and the lean air/fuel ratio based on ammonia slip through the selective catalytic reduction device during the second condition. A sixth example of the method, optionally including one or more of the first through fifth examples, further includes where the air/fuel ratio is adjusted to a lean air/fuel ratio in response to the ammonia slip through the selective catalytic reduction device being less than the threshold slip and the lean $NO_x$ trap demanding a regeneration during the first condition. A seventh example of the method, optionally including one or more of the first through sixth examples, further includes where the air/fuel ratio is adjusted to a rich air/fuel ratio in response to one or more of the selective catalytic reduction device demanding ammonia and the lean $NO_x$ trap demanding regeneration during the first condition. An eighth example of the method, optionally including one or more of the first through seventh examples, further includes where the lean air/fuel ratio generates a lambda value between 1.1 to 1.3 and the rich air/fuel ratio generates a lambda value between 0.7 to 0.9 during the first condition, where the lambda value is measured by an exhaust gas sensor arranged in an exhaust passage housing the lean $NO_x$ trap and the selective catalytic reduction device.

A system comprising an engine coupled to an exhaust passage housing a lean $NO_x$ trap and a selective catalytic reduction device, where the lean $NO_x$ trap is close-coupled to the engine and arranged upstream of the selective catalytic reduction device relative to a direction of exhaust gas flow and a controller with computer-readable instructions stored on memory thereon that when implemented enable the controller to adjust an air/fuel ratio of the engine in response to one or more of a $NO_x$ load of the lean $NO_x$ trap being less than a lower threshold $NO_x$ load, the $NO_x$ load being greater than an upper threshold $NO_x$ load, and ammonia slip from an selective catalytic reduction device being less than a threshold slip. A first example of the system further includes where the air/fuel ratio is lean in response to the $NO_x$ load of the $NO_x$ trap being less than the lower threshold $NO_x$ load and where the air/fuel ratio is rich in response to the $NO_x$ load of the $NO_x$ trap being greater than the upper threshold $NO_x$ load. A second example of the system, optionally including the first example, further includes where close-coupling the lean $NO_x$ trap comprises mounting the lean $NO_x$ trap directly downstream of an exhaust manifold of the engine. A third example of the system, optionally including the first and/or second examples, further includes where the lean $NO_x$ trap is a first lean $NO_x$ trap, further comprising a second lean $NO_x$ trap arranged between the first lean $NO_x$ trap and the selective catalytic reduction device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
   estimating engine operating conditions;
   during a first condition, where the first condition includes detecting that a temperature of a lean $NO_x$ trap is less than a threshold temperature via a temperature sensor, and where the lean NOx trap is positioned in an exhaust passage of an engine, adjusting an air/fuel ratio in response to the lean $NO_x$ trap demanding a regeneration and detecting an ammonia slip through a selective catalytic reduction device that is less than a threshold slip based on an exhaust gas sensor located directly downstream of the selective catalytic reduction device; and
   adjusting the air/fuel ratio in response to one or more of or each of detecting a $NO_x$ load of the lean $NO_x$ trap reaching a lower threshold $NO_x$ load based on an exhaust gas sensor located directly downstream of the lean $NO_x$ trap and detecting that the ammonia slip through the selective catalytic reduction device has reached the threshold slip based on the exhaust gas sensor located directly downstream of the selective catalytic reduction device during a second condition, where the second condition includes detecting that the temperature of the lean $NO_x$ trap is greater than the threshold temperature via the temperature sensor, and wherein adjusting the air/fuel ratio includes one or more of adjusting a position of an intake throttle of the engine and adjusting an amount of fuel injected into one or more cylinders of the engine.

2. The method of claim 1, wherein the threshold temperature is based on the temperature of the lean $NO_x$ trap where the lean $NO_x$ trap passively leaks $NO_x$ stored thereon.

3. The method of claim 1, wherein the lean $NO_x$ trap is configured to capture $NO_x$ generated by the engine during the first condition when the temperature of the lean $NO_x$ trap is less than the threshold temperature and the lean $NO_x$ trap does not demand a regeneration.

4. The method of claim 1, wherein the air/fuel ratio is adjusted to a rich air/fuel ratio in response to the selective catalytic reduction device demanding ammonia and the $NO_x$ load of the lean $NO_x$ trap being greater than the lower threshold $NO_x$ load during the second condition, and where the air/fuel ratio is adjusted to a leaner air/fuel ratio during the second condition in response to the selective catalytic reduction device not demanding ammonia during the second condition.

5. The method of claim 4, wherein the rich air/fuel ratio generates a lambda value between 0.4 to 0.6 and the lean air/fuel ratio generates a lambda value between 1.1 to 1.3 during the second condition, where the lambda value is measured by an exhaust gas sensor arranged in the exhaust passage housing the lean $NO_x$ trap and the selective catalytic reduction device.

6. The method of claim 4, wherein the air/fuel ratio oscillates between the rich air/fuel ratio and the lean air/fuel ratio based on the ammonia slip through the selective catalytic reduction device during the second condition.

7. The method of claim 1, wherein the air/fuel ratio is adjusted to a lean air/fuel ratio in response to the ammonia slip through the selective catalytic reduction device being less than the threshold slip and the lean $NO_x$ trap demanding a regeneration during the first condition.

8. The method of claim 7, wherein the air/fuel ratio is adjusted to a rich air/fuel ratio in response to one or more of the selective catalytic reduction device demanding ammonia slip and the lean $NO_x$ trap demanding regeneration during the first condition.

9. The method of claim 8, wherein the lean air/fuel ratio generates a lambda value between 1.1 to 1.3 and the rich air/fuel ratio generates a lambda value between 0.7 to 0.9 during the first condition, where the lambda value is measured by the exhaust gas sensor arranged in the exhaust passage housing the lean $NO_x$ trap and the selective catalytic reduction device.

10. A vehicle system, comprising:
an engine coupled to an exhaust passage housing a lean $NO_x$ trap and a selective catalytic reduction device, where the lean $NO_x$ trap is close-coupled to the engine and arranged upstream of the selective catalytic reduction device relative to a direction of exhaust gas flow;
a first exhaust gas sensor positioned in the exhaust passage, the first exhaust gas sensor located directly downstream of the lean $NO_x$ trap;
a second exhaust gas sensor positioned in the exhaust passage, the second exhaust gas sensor located directly downstream of the selective catalytic reduction device; and
a controller with computer-readable instructions stored on memory thereon that when implemented enable the controller to:
adjust an air/fuel ratio of the engine in response to one or more of detecting a $NO_x$ load of the lean $NO_x$ trap that is less than a lower threshold $NO_x$ load based on the first exhaust gas sensor, detecting that the $NO_x$ load is greater than an upper threshold $NO_x$ load based on the first exhaust gas sensor, and detecting that ammonia slip from the selective catalytic reduction device is less than a threshold slip based on the second exhaust gas sensor, wherein adjusting the air/fuel ratio includes one or more of adjusting a position of an intake throttle of the engine and adjusting an amount of fuel injected into one or more cylinders of the engine.

11. The vehicle system of claim 10, wherein the air/fuel ratio is lean in response to the $NO_x$ load of the lean $NO_x$ trap being less than the lower threshold $NO_x$ load and where the air/fuel ratio is rich in response to the $NO_x$ load of the lean $NO_x$ trap being greater than the upper threshold $NO_x$ load.

12. The vehicle system of claim 10, wherein close-coupling the lean $NO_x$ trap comprises mounting the lean $NO_x$ trap directly downstream of an exhaust manifold of the engine.

13. The system of claim 10, wherein the lean $NO_x$ trap is a first lean $NO_x$ trap, and wherein the system further comprises a second lean $NO_x$ trap arranged between the first lean $NO_x$ trap and the selective catalytic reduction device.

* * * * *